(12) United States Patent
Chickering

(10) Patent No.: US 8,291,468 B1
(45) Date of Patent: Oct. 16, 2012

(54) TRANSLATING AUTHORIZATION INFORMATION WITHIN COMPUTER NETWORKS

(75) Inventor: Roger A. Chickering, Granite Bay, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 665 days.

(21) Appl. No.: 12/475,230

(22) Filed: May 29, 2009

Related U.S. Application Data

(60) Provisional application No. 61/164,607, filed on Mar. 30, 2009.

(51) Int. Cl.
G06F 17/00 (2006.01)
(52) U.S. Cl. ............................. 726/1; 709/229; 709/227
(58) Field of Classification Search .................. None
See application file for complete search history.

(56) References Cited

U.S. PATENT DOCUMENTS

| | | | |
|---|---|---|---|
| 7,010,600 B1 | 3/2006 | Prasad et al. | |
| 2007/0101406 A1 | 5/2007 | Zavalkovsky et al. | |
| 2007/0283443 A1* | 12/2007 | McPherson et al. | 726/26 |
| 2008/0066151 A1* | 3/2008 | Thomsen et al. | 726/1 |
| 2008/0261598 A1 | 10/2008 | Tinnakornsrisuphap | |

OTHER PUBLICATIONS

TNC IF-MAP Binding for SOAP, http://www.trustedcomputing-group.org, May 18, 2009, 99 pp.*

"TNC IF-MAP Binding for SOAP," http://www.trustedcomputing-group.org, May 18, 2009, 99 pp.
"Port-Based Network Access Control," IEEE Standard for Local and metropolitan area networks, IEEE Std 802.1X™—2004 (Revision of IEEE Std 802.1X-2001), Dec. 13, 2004, 72 pgs.
"TCG Trusted Network Connect, TNC IF-MAP binding for SOAP," Trusted Computing Group, Incorporated, Specification Version 1.0, Revision 25, Apr. 28, 2008, 99 pgs.
"Making NAC Security-Aware with IF-MAP," Interop Labs, Network Access Control Interoperability Lab, Metadata Access Point, Apr. 29, 2008, 2 pgs.
"Trusted Network Connect IF-MAP Announcement FAQ," Trusted Computing Group, Apr. 2008, 2 pgs.

* cited by examiner

*Primary Examiner* — Fikremariam A Yalew
(74) *Attorney, Agent, or Firm* — Shumaker & Sieffert, P.A.

(57) ABSTRACT

In general, techniques are described for translating authorization information within computer networks. For example, a first network device of a computer network may receive authentication information from an endpoint device requesting access to the computer network. The first network device authenticates the endpoint device based on this authentication information and stores authorization information in accordance with a first vendor-specific authorization data model. The first network device stores and applies an export translation policy to translate this information from the vendor-specific data model to a vendor-neutral authorization data model, which it then publishes to an intermediate storage device that implements the vendor-neutral data model. A second network device of the computer network may store an import translation policy to translate this same authorization information from the vendor-neutral authorization data model to a different vendor-specific data model. In this manner, the techniques facilitate translation of authorization information within computer networks.

31 Claims, 9 Drawing Sheets

TRANSLATING AUTHORIZATION INFORMATION WITHIN COMPUTER NETWORKS

This application claims the benefit of U.S. Provisional Application No. 61/164,607, filed Mar. 30, 2009, which is hereby incorporated by reference in its entirety.

TECHNICAL FIELD

The invention relates to computer networks and, more particularly, to network access control within computer networks.

BACKGROUND

Enterprises and other organizations implement network access control in order to control the ability of endpoint devices to communicate on a computer network. For example, an enterprise may implement a computer network that includes an email server. In order to prevent unauthorized users from communicating with this email server, the enterprise may implement a network access control system that prevents unauthorized users from sending network communications on the computer network unless the users provide a correct username and password. In another example, an enterprise may wish to prevent devices that are infected with computer viruses from communicating with devices on a network of the enterprise. In this example, the enterprise may implement a network access control system that prevents devices that do not have current anti-virus software from communicating on the network.

Enterprises may use the 802.1X protocol to implement network access control. Three separate types of devices are typically present in networks that implement network access control using the 802.1X protocol. These devices typically include supplicant devices, policy decision points, and policy enforcement points. Supplicant devices are devices that are attempting to connect to the network and may be referred to as endpoint devices. Policy decision points evaluate information from the supplicant devices in order to decide whether to grant the supplicant devices access to a network. An example of a policy decision point may include an authentication server. Policy enforcement points enforce the decisions made by the policy decision points with regard to individual supplicant devices. One example of a policy enforcement point is layer two (L2) switch or access point.

An endpoint device may send a connection request in the 802.1X protocol to the L2 switch. This connection request may be comprised of a series of 802.1X messages that the L2 switch may forward to the authentication server. The authentication server may send responses back to the L2 switch and the L2 switch may forward these responses back to the endpoint device. These 802.1X messages may include security credentials (e.g., a username and password) and information about the "health" of the endpoint device. This health information may, for example, include information indicating whether a most current operating system patch is installed on the supplicant device, whether a most current version of anti-virus software has been installed on the supplicant device, and other information.

Enterprises may also use other strategies to implement network access control, such as inserting firewalls between endpoint devices and server or other network resources. In order to access the protected server resources, an endpoint device provides identity information and health information to an authentication server. If the identity information and health information conform to the authentication server's authentication policies, the authentication server may provision access to server resources for the endpoint device through firewalls (which may represent policy enforcement points in this strategy).

Typically, the authentication server may maintain the security credentials, health information and any other information relevant to properly authenticating the endpoint device in accordance with the network access control policies according to an authorization data model or authorization model, for short. That is, the authentication server may maintain various classes of data and store the information determined from the endpoint device to these various classes of data. This authorization model may be proprietary or specific to a vendor of the authentication server. The firewall may also maintain this authorization model using a proprietary or otherwise vendor-specific authorization model. The limitations of vendor-specific authorization models may force enterprises to adopt a single vendor to provide both the authentication server and the firewall in order to facilitate the above interaction and communication between the two devices and thereby provide a coherent network access control strategy. This single-vendor limitation may prohibit enterprises from adopting this network access control strategy and/or deter adoption of fledgling but potentially beneficial network access control technologies.

SUMMARY

In general, techniques are described for translating authorization information within a computer network. More particularly, the techniques facilitate translation of authorization information to and from a vendor-neutral authorization data model, such as a data model defined by an Interface for Metadata Access Point (IF-MAP) standard. An intermediate storage device, such as a server, may store authorization information in accordance with this IF-MAP data model. Various network devices, such as an authentication device and a network security device, may publish and retrieve this IF-MAP authorization information to and from the IF-MAP server.

The various network devices, however, may implement one or more different, often proprietary or vendor-specific, authorization data models. These various network devices may implement the translation techniques described herein to define an export translation policy by which to translate authorization information stored in accordance with a first vendor-specific authorization data model into translated authorization information that complies with the vendor neutral authorization data model. Moreover, the various network devices may implement the translation techniques to define an import translation policy by which to translate the translated authorization information stored in accordance with the vendor-neutral authorization data model into authorization information that complies with the first or any other vendor-specific authorization data model. In this manner, the techniques may facilitate translation of authorization information to enable various devices within a network to both publish and retrieve authorization information despite implementing different vendor-specific or proprietary authorization data models.

For example, an authentication device, such as a Remote Access Dial In User Service (RADIUS) server may comprise an authorization database that stores authorization information in accordance with a first authorization data model. This first authorization data model may comprise a vendor-specific or proprietary authorization data model. The RADIUS server may also include a policy database that stores data defining an export translation policy in accordance with the techniques described herein. The RADIUS server may further include a control unit that receives authentication information from an endpoint device. The control unit may receive the authentication information from a switch or other device positioned intermediate to or between the endpoint device and the RADIUS server. The switch may issue a challenge to the endpoint device in response to the endpoint device attempting to access protected network resources, such as a servers, included within a network. In response to the challenge, the endpoint device may provide the authentication information, which the switch forwards to the RADIUS server for authentication.

The control unit of the RADIUS server authenticates the endpoint device based on the authentication information and stores, based on the authentication, the received authorization information in accordance with the first authorization data model to the authorization database. The control unit then applies the export translation policy to translate the received authorization information stored in accordance the first authorization data model into translated authorization information that complies with a second vendor-neutral authorization data model, e.g., the IF-MAP data model. After generating the translated authorization information, the control unit publishes the translated authorization information to the intermediate storage device that implements the second authorization data model, e.g., the IF-MAP server. In this manner, the authentication device may export authorization information received from an endpoint device and stored in accordance with a first proprietary authorization data model as vendor-neutral authorization information for use by other network devices that may implement a second or different vendor-specific authorization data model.

To illustrate, a network security device that protects the protected network resources, e.g., a firewall, may implement the techniques to import the vendor-neutral authorization information stored by the RADIUS server to the intermediate storage device. The firewall may comprise a policy database that stores an import translation policy. The firewall may implement a second or different vendor-specific authorization data model different from the first authorization data model implemented by the RADIUS server. The import translation policy may translate the vendor-neutral authorization information into translated authorization information that complies with this second or different vendor-specific authorization data model.

The firewall may further comprise a control unit that that receives network traffic from the endpoint device and requests, in response to receiving the network traffic, the vendor-neutral authorization information from the intermediate storage device. The control unit of the firewall receives this vendor-neutral authorization information from the intermediate storage device and applies the import translation policy to translate the authorization information stored in accordance with this vendor-neutral authorization data model into translated authorization information that complies with a second vendor-specific authorization data model. The control unit of the firewall may forward the network traffic based on the translated authorization information that complies with the second vendor-specific authorization data model. In this manner, the network security device may import authorization information associated with the endpoint device and stored in accordance with a vendor-neutral authorization data model as vendor-specific authorization information for use in granting or denying network traffic received from that endpoint device access to the protected network resources.

In this respect, the techniques may facilitate communication of authorization information between devices that implement different authorization data models. The techniques leverage the vendor-neutral authorization data model to reduce export and import complexity. In other words, rather than implement an import and export policy to translate between every combination of vendor-specific authorization data models, the techniques reduce the number of import and export policies required to translate between vendor-specific authorization data models by using the vendor-neutral authorization data model as a "go-between." As an example, consider N different vendor-specific authorization data models. To convert or translate directly between these N different vendor-specific authorization data models, $N^2-N$ (which is approximately $N^2$) number of translation policies need be defined. However, by converting or translating to the vendor-neutral authorization data model, only N number of translation policies need be defined. In this respect, the techniques may leverage the vendor-neutral authorization data model to reduce complexity.

In one embodiment, a method comprises receiving, with an authentication device, authentication information from an endpoint device, authenticating, with the authentication device, the endpoint device based on the authentication information and, based on the authentication, storing, with the authentication device, the authorization information in accordance with a first authorization data model. The method further comprising applying, with the authentication device, an export translation policy to translate the authorization information stored in accordance the first authorization data model into translated authorization information that complies with a second authorization data model, wherein the second authorization data model is different from the first authorization data model and publishing, with the authentication device, the translated authorization information to an intermediate storage device that implements the second authorization data model.

In another embodiment, a method comprises receiving, with a network security device, network traffic from an endpoint device, in response to receiving the network traffic, requesting, with the network security device, authorization information from an intermediate storage device, wherein the intermediate storage device stores the authorization information in accordance with a first authorization data model, and receiving, with the network security device, the authorization information from the intermediate storage device. The method further comprises applying, with the network security device, an import translation policy to translate the authorization information stored in accordance the first authorization data model into translated authorization information that complies with a second authorization data model, wherein the second authorization data model is different from the first authorization data model and forwarding, with the network security device, the network traffic based on the translated authorization information.

In another embodiment, an authentication device comprises an authorization database that stores authorization information in accordance with a first authorization data model, a policy database that stores data defining an export translation policy and a control unit. The control unit comprises an authentication agent that receives authentication information from an endpoint device, authenticates the endpoint device based on the authentication information, and stores, based on the authentication, authorization information in accordance with the first authorization data model to the authorization database, a translation module that applies the export translation policy to translate the received authorization information stored in accordance the first authorization data model into translated authorization information that complies with a second authorization data model, wherein the second authorization data model is different from the first authorization data model and a client module that publishes the translated authorization information to an intermediate storage device that implements the second authorization data model.

In another embodiment, a network security device comprises a policy database that stores an import translation policy and a control unit. The control unit comprises an admission module that receives network traffic from an endpoint device and a client module that requests, in response to receiving the network traffic, authorization information from an intermediate storage device, wherein the intermediate authorization storage device stores the authorization information in accordance with a first authorization data model, and receives the authorization information from the intermediate storage device. The control unit further comprises a translation module that applies the import translation policy to translate the authorization information stored in accordance the first authorization data model into translated authorization information that complies with a second authorization data model, wherein the second authorization data model is different from the first authorization data model. The admission module forwards the network traffic based on the translated authorization information.

In another embodiment, a network system comprises an endpoint device and a network. The network includes an authentication device that authenticates the endpoint device in accordance with a first vendor-specific data model, an intermediate storage device that implements a vendor-neutral authorization data model, a protected resource server, and a network security device that controls access to the protected resource server in accordance with a second vendor-specific data model, wherein the second vendor-specific authorization data model is different from the first vendor-specific authorization data model. The authentication device comprises a first authorization database that stores authorization information in accordance with a first vendor-specific authorization data model, a first policy database that stores data defining an export translation policy, and a first control unit. The first control unit comprises an authentication agent that receives authentication information from an endpoint device, authenticates the endpoint device based on the authentication information, and stores, based on the authentication, authorization information in accordance with the first authorization data model to the authorization database, a first translation module that applies the export translation policy to translate the authorization information stored in accordance the first authorization data model into translated authorization information that complies with a vendor-neutral authorization data model, wherein the vendor-neutral authorization data model is different from the first authorization data model, and a first client module that publishes the translated authorization information to an intermediate storage device that implements the vendor-neutral authorization data model. The network security device comprises a second policy database that stores an import translation policy and a second control unit. The second control unit comprises an admission module that receives network traffic from an endpoint device, a second client module that requests, in response to receiving the network traffic, authorization information from an intermediate storage device, wherein the intermediate authorization storage device stores the authorization information in accordance with a vendor-neutral authorization data model, and receives the authorization information from the intermediate storage device, and a second translation module that applies the import translation policy to translate the authorization information stored in accordance with the vendor-neutral authorization data model into translated authorization information that complies with a second vendor-specific authorization data model, wherein the second vendor-specific authorization data model is different from the first vendor-specific authorization data model. The admission module further forwards the network traffic based on the translated authorization information.

In another embodiment, a computer-readable medium comprising instructions for causing a programmable processor to receive, with an authentication device, authentication information from an endpoint device, authenticates, with the authentication device, the endpoint device based on the authentication information, based on the authentication, stores, with the authentication device, authorization information in accordance with a first authorization data model, applies, with the authentication device, an export translation policy to translate the authorization information stored in accordance the first authorization data model into translated authorization information that complies with a second authorization data model, wherein the second authorization data model is different from the first authorization data model, and publish, with the authentication device, the translated authorization information to an intermediate storage device that implements the second authorization data model.

In another embodiment, a computer-readable medium comprising instructions for causing a programmable processor to receive, with a network security device, network traffic from an endpoint device, in response to receiving the network traffic, request, with the network security device, authorization information from an intermediate storage device, wherein the intermediate storage device stores the authorization information in accordance with a first authorization data model, receive, with the network security device, the authorization information from the intermediate storage device, apply, with the network security device, an import translation policy to translate the authorization information stored in accordance the first authorization data model into translated authorization information that complies with a second authorization data model, wherein the second authorization data model is different from the first authorization data model, and forward, with the network security device, the network traffic based on the translated authorization information.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
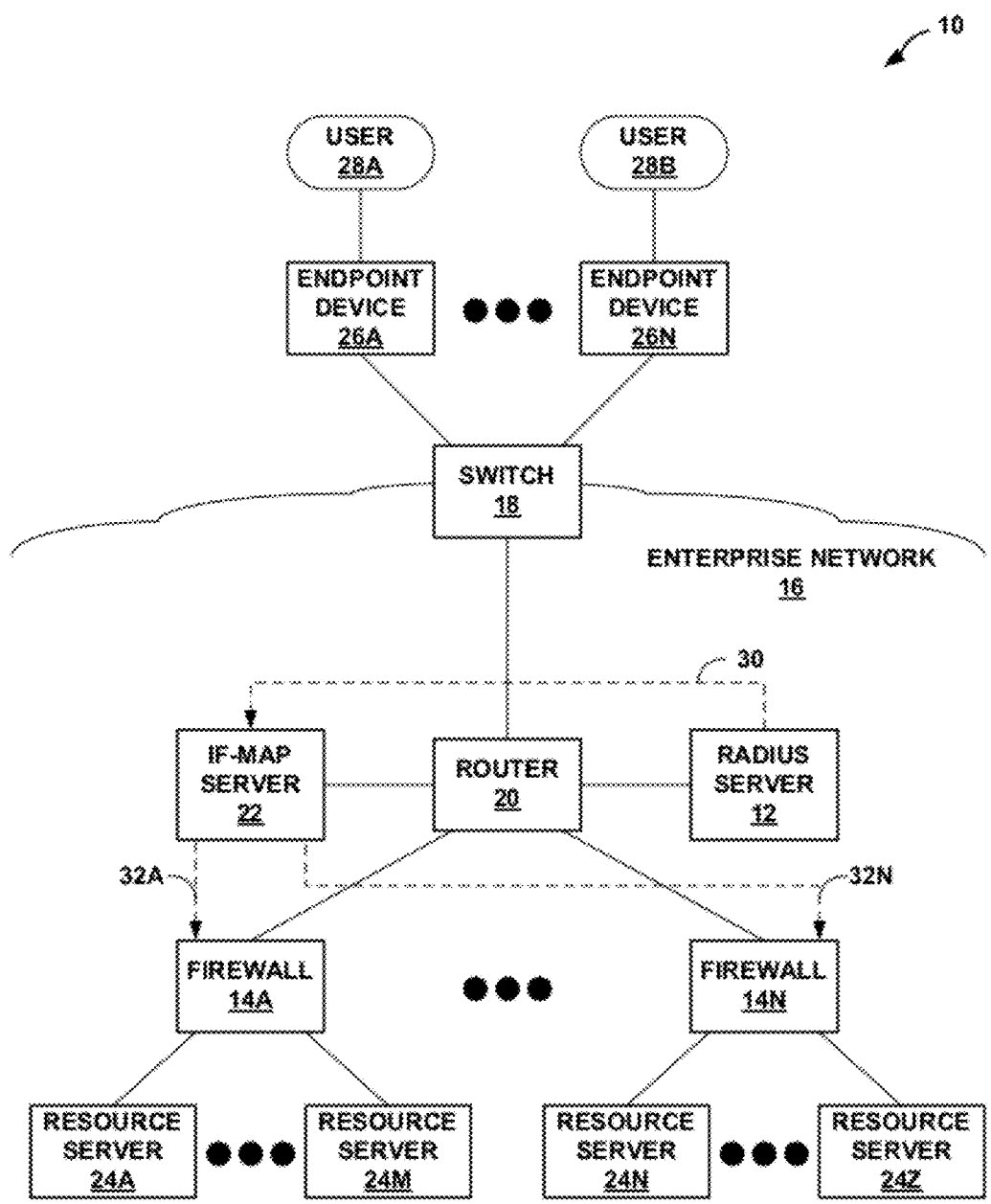
FIG. 1 is a block diagram illustrating an example network system in which one or more network devices implement the techniques described herein to translate authorization information from one authorization data model to another authorization data model.

FIG. 1 is a block diagram illustrating an example network system 10 in which one or more network devices implement the techniques described herein to translate authorization information from one authorization data model to another authorization data model. In particular, an authentication device shown by way of example in FIG. 1 as a Remote Access Dial In User Service (RADIUS) server 12 ("RADIUS server 12") may implement the techniques to translate authorization data stored in accordance with a proprietary or vendor-specific authorization data model into authorization data that complies with a vendor-neutral authorization data model, such as a data model defined by an Interface for Metadata Access Point (IF-MAP) standard. RADIUS server 12 may then publish this resulting translated authorization data so that other network devices, such as one or more of firewalls 14A-14N ("firewalls 14"), may access this translated authorization data that complies with the vendor-neutral authorization model.

However, as one or more firewalls 14 may not implement the vendor-neutral authorization data model and instead implement a proprietary or vendor-specific authorization data model different from that implemented by RADIUS server 12, these firewalls 14 may also implement the techniques to translate the authorization data stored in accordance with the vendor-neutral authorization data into authorization data that complies with the different proprietary or vendor-specific authorization model implemented by each of these firewalls 14. In this respect, the techniques may enable network devices from disparate vendors that implement different authorization data models to communicate with one another by facilitating export translation, as described above with respect to RADIUS server 12, and import translation, as described above with respect to firewalls 14. Accordingly, enterprises may integrate network access control devices from varying vendors, which may not only increase the feasibility of certain network access control strategies, but also spur adoption of potentially beneficial emerging network access control technologies.

While described herein with respect to a particular authentication network device, e.g., RADIUS server 12, the export translation aspects of the techniques may be implemented by any network device capable of storing authorization information in accordance with a proprietary or vendor-specific authorization data model. Likewise, while described herein with respect to a particular network security device, e.g., firewall 12A, the import translation aspects of the techniques may be implemented by any network device capable of storing authorization information in accordance with a proprietary or vendor-specific authorization data model. Both aspects of the techniques should therefore not be limited to the example set forth below with respect to FIG. 1.

As shown in the example of FIG. 1, network system 10 includes an enterprise network 16. Enterprise network 16 may represent a private network owned and operated by a business, university, school or other private or public entity. Enterprise network 16 may be "private" in the sense that the public in general may not access enterprise network 16 without providing security credentials or other authentication information necessary to access enterprise network 16. In this sense, enterprise network 16 may restrict access by the public to enterprise network 16. Such practices of restricting access are typically referred to as network access control or NAC. NAC may involve, at the least, requesting security credentials, such as a username and password, in order to verify an identity of a user requesting access via an endpoint device to enterprise network 16.

Often, more involved NAC demands additional information, such as "health" information describing a condition of vulnerability of the endpoint device. The health information may comprise information identifying whether anti-virus software executing on the endpoint device is current or up-to-date, whether an operating system executed by the endpoint device has applied the latest security patches, whether dangerous software is executing on the endpoint device, and other information concerning the health or safety of the endpoint device. The term "authorization information" as used herein may represent any information received from an endpoint device during NAC to authenticate or otherwise authorize an endpoint device to access a network, such as enterprise network 16, as well as any capabilities, roles, access control lists, or any other information which could be used by a policy to authorize access to a particular resource. While described with respect to authorization information, the techniques may apply to any form, type or category of information or simply information in general that is stored or otherwise maintained in accordance with a proprietary or vendor-specific data model, where this data model inhibits or hampers communication of this information with other devices that maintain similar information in accordance with a different proprietary or vendor-specific data model.

Enterprise network 16 may include a number of network devices, including switch 18, router 20, RADIUS server 12, IF-MAP server 22, firewalls 14 and resource servers 24A-24Z ("resource servers 24"). Switch 18 may comprise a network device that "switches" network traffic. Switch 18 may, for example, switch network traffic by receiving network traffic via one or more physical or logical interfaces from one or more endpoint devices, such as endpoint devices 26A-26N ("endpoint devices 26"), and forwarding this network traffic to one or more other network devices, such as router 20, via one or more other physical or logical interfaces. Switch 18 may comprise a Layer two (2) or L2 network device, where L2 refers to a corresponding one of the seven layers defined by the Open Systems Interconnection (OSI) reference model. Switches in general may be differentiated from routers in that switches do not commonly maintain route data or otherwise actively route data by resolving the route data to select a next hop to which to send network traffic. Rather, switches may simply define static associations between interfaces and switch the network traffic between interfaces based on which interface received the network traffic and a destination to which the network traffic is destined.

Router 20 may comprise a network device that actively routes data from a source to a destination. Router 20 may receive and store data defining routes through the network and resolve this so-called route data to select one or more routes by which to route traffic destined for a particular destination. Router 20 may implement a routing protocol or other network protocol by which to receive this route data and may continually receive updates, additions or deletions to the route data. In this respect, router 20 may maintain a current view of the network topology so as to actively route data along paths through a network, such as enterprise network 16. Router 20 may comprise a L3 network device that routes discrete data units, such as packets, of the network traffic on an individual per-packet basis to each intended destination specified within a header of each packet. Router 20 communicatively couples to switch 18, radius server 12, IF-MAP server 22 and each of firewalls 14. While shown as directly connecting to each of these devices in the example of FIG. 1 for ease of illustration purposes, router 20 may indirectly couple to these devices through connections to other L2 or L3 network devices, such as other switches, hubs, access points, and/or routers.

RADIUS server 12 may represent a network device and, more particularly, an authentication network device (which may be simply referred to as an "authentication device"). RADIUS server 12 may implement a RADIUS authentication protocol by which to authenticate endpoint devices, such as endpoint devices 26. Typically, the RADIUS authentication protocol authenticates a device, such as one of endpoint devices 26, via a challenge and response procedure where RADIUS server 12 may challenge the one of endpoint devices 26 to prove its identity. Endpoint device 26 may then respond with security credentials, e.g., a username and password, identifying a user, such as one of users 28A-28N ("users 28"), using the corresponding one of endpoint devices 26 to access enterprise network 16. RADIUS server 12 may then authenticate the one of users 28 based on the provided security credentials. More information concerning the RADIUS protocol in general and implementation aspects of this protocol can be found in a Request For Comments (RFC) 2865, entitled "Remote Authentication Dial In User Server (RADIUS)," dated June 2000, the contents of which are hereby incorporated by reference as if fully set forth herein.

RADIUS server 12 may, in addition to implementing the RADIUS protocol, also provide additional authentication capabilities to verify the health or other status of the one of endpoint devices 26 requesting access to enterprise network 16. RADIUS server 12 may, as one example, implement Trusted Network Connect (TNC) techniques to verify a behavior of the one of endpoint devices 26 requesting access to enterprise network 16. TNC not only requires that RADIUS server 12 implement these techniques, but also generally requires that the one of endpoint devices 26 requesting access to enterprise network 16 include a trusted agent (not shown in FIG. 1). The agent may comprise hardware and/or software that evaluates the behavior of its host endpoint device and reports this behavior to the corresponding TNC module executing on RADIUS server 12 as health and other information. RADIUS server 12 may evaluate this behavior information, e.g., the health and other information, by applying authentication policies to determine whether the one of endpoint devices 26 requesting access to enterprise network 16 is operating according to pre-defined and trusted behavior or, in other words, is secure and healthy.

Both RADIUS server 12 and switch 18 may, in this respect, implement a form of Network Access Control (NAC) by which to control access to enterprise network 16. RADIUS server 12 and switch 18 may, for example, implement a form of NAC defined in an Institute of Electrical and Electronics Engineers (IEEE) standard referred to as 802.1X. In the context of the IEEE 802.1X standard, RADIUS server 12 may generally represent a policy decision point or authentication server that applies one or more pre-defined authentication policies to evaluate security credentials and possibly other information, such as the above described behavior information, to authenticate a supplicant device, which is represented in this case as one of endpoint devices 26. Switch 18 may represent, in the context of the IEEE 802.1X standard, a policy enforcement point or authenticator that initially challenges endpoint devices 26 requesting access to enterprise network 16 for authentication information, e.g., the above described security credentials.

Switch 18 may then forward this authentication information to RADIUS server 12, which may authenticate users 28 using these endpoint devices 26. RADIUS server 12 may then request the additional information, e.g., the behavior information, from endpoint devices 26 or endpoint devices 26 may automatically provide this information to RADIUS server 12. RADIUS server 12 may then evaluate the behavior information to ensure these endpoint devices 26 are themselves secure and trustworthy. RADIUS server 12 may then authenticate these endpoint devices 26 based on the security credentials, the behavior information or both the security credentials and the behavior information. Authentication information may therefore comprise security credentials, behavior information or any combination thereof, as well as any other information used to authenticate one of users 28 or endpoint devices 26, such as token values.

RADIUS server 12 may then communicate the results of authenticating these endpoint devices 26 to the policy enforcement point, e.g., switch 18, which may either permit or deny access to enterprise network 16 by one or more of those of endpoint devices 26 requesting access to enterprise network 16 based on the authentication results. In this respect, switch 18 may comprise a policy enforcement point in that switch 18 enforces authentication polices maintained and applied by the policy decision point, e.g., RADIUS server 12 to permit or deny access to enterprise network 16. More information concerning the IEEE 802.1X standard can be found in IEEE standard 802.1X-2004, entitled "802.1X IEEE standard for Local and Metropolitan Area Networks, Port Based Network Access Control," dated Dec. 13, 2004, hereby incorporated by reference as if fully set forth herein.

Firewalls 14 may also comprise policy enforcement points or authenticators within the meaning of the IEEE 802.1X NAC standard. However, rather than challenge endpoint devices 16, firewalls 14 may also store data defining admission control polices by which to determine whether to permit or deny access to select resource servers 24. For example, firewall 14A may apply admission control policies to determine whether to permit endpoint device 26A to access one or more of resources servers 24 protected by firewall 14A, e.g., resource servers 24A-24M. Firewalls 14 may each therefore represent a network security device that applies policies to deny or permit access to enterprise network 16 or portions thereof, such as sets of resource servers 24.

Resource servers 24 may comprise network devices that provide a network resource, such as a network application or service (e.g., a Session Initiation Protocol or SIP server), store and provide access to data (e.g., a web server), or a combination of both (e.g., an email server that both supports email services and stores and provides access to data in the form of emails). For example, resource servers 24 may each comprise one or more of an email server, a print server, a data server, a web or Hyper Text Transfer Protocol (HTTP) server, a SIP server, an application server, an email server, a networked workstation, a desktop computer, a laptop computer, a cellular or mobile phone, a Personal Digital Assistant (PDA), or any other device capable of providing access to a network resource for use by other network devices, such as endpoint devices 26. Endpoint devices 26 may comprise any computing device with which a corresponding one of users 28 may interact to access enterprise network 16. Each of endpoint devices 26 may, for example, comprise a desktop computer, a laptop computer, a workstation, a mobile or cellular device, a so-called "smartphone," a PDA, or any other computing device.

Interface for Metadata Access Point (IF-MAP) server 22 ("IF-MAP server 22") may represent an intermediate network device that stores authorization information in accordance with a vendor-neutral authorization data model. "IF-MAP" refers to an emerging authorization data model that provides a standardized authorization data model that vendors may adopt so as to reduce communication or interoperability issues that arise between vendor-specific or proprietary authorization data models. The group responsible for introducing IF-MAP, known as the Trusted Computing Group (TCG), is encouraging vendors to accept this new IF-MAP standard and vendors are releasing devices compliant with this standard.

The IF-MAP standard provides not only a vendor-neutral or cross-vendor authorization data model but also provides an IF-MAP protocol by which to access the authorization information stored according to this standard, vendor-neutral authorization data model. The IF-MAP protocol supports various IF-MAP messages or communications by which to publish authorization information, search authorization information stored within IF-MAP server 22, subscribe to authorization information stored within IF-MAP server 22, and poll IF-MAP server 22 for authorization information to which a given device is subscribed. More information concerning the IF-MAP cross-vendor or vendor-neutral data model and protocol can be found in a specification entitled "TNC IF-MAP binding for SOAP," published Apr. 28, 2008 by the Trusted Computing Group, the contents of which are hereby incorporated by reference as if set forth in its entirety.

While described herein with respect to this particular vendor-neutral authorization data model set forth by the IF-MAP standard, the techniques may be implemented with respect to any standard or accepted authorization data model. Moreover, while described as a separate device, e.g., a standalone database, IF-MAP server 22 may be integrated within any one of the network devices shown as residing within enterprise network 16 in FIG. 1. For example, RADIUS server 12 may include an integrated IF-MAP server 22. The techniques therefore should not be limited to the examples set forth in this disclosure.

For various reasons, vendors or other network device manufactures may decide not to forgo their proprietary or vendor-specific authorization data models and adopt the vendor-neutral authorization data models. A proprietary authorization data model may be more obscure or transparent to malicious users or hackers and therefore provide more security in this respect. Moreover, vendors may have spent large sums of money developing and implementing a coherent proprietary authorization data model. Moreover, vendors may not want to forgo a proprietary authorization data model for competitive reasons, as a proprietary authorization data model may capture more of an enterprise's business through interoperability concerns. From the perspective of the enterprise however this lack of interoperability between devices of different vendors may prevent rapid deployment of other more advanced or more beneficial network access control strategies due to interoperability and cost concerns. Furthermore, enterprises may be particularly hesitant to purchase these types of products from smaller or less financially secure companies that may fail and therefore leave enterprises with little options but to re-implement in large scale a new network access control infrastructure using other vendors' products.

In accordance with the translation techniques described herein, an administrator or other user responsible for maintaining enterprise network 16 (not shown in FIG. 1) may interact with one or more of RADIUS server 12 and firewalls 14 to enter data or input defining one or more translation policies. These translation policies may enable RADIUS server 12 and firewalls 14 to overcome the above lack of interoperability between devices 12 and 14 that are assumed for purposes of illustration to implement network access control using different proprietary authorization data models.

For purposes of illustration, it is assumed that RADIUS server 12 implements a first authorization data model that is proprietary or vendor-specific and that one of firewalls 14, e.g., firewall 14A, implements a second authorization data model that is also proprietary or vendor-specific and which is different from the first authorization data model. Therefore, RADIUS server 12 may not interoperate with firewall 14A due to the conflicting proprietary authorization models. While IF-MAP server 22 provides an intermediary storage device that resides between RADIUS server 12 and firewall 14A and which stores authorization information according to a vendor-neutral authorization data model, IF-MAP server 22 only solves the interoperability issue when both RADIUS server 12 and firewall 14A support the IF-MAP data model. In instances where a network device implements a proprietary authorization data model, IF-MAP server 22 may provide little if any help in solving the interoperability issue.

However, the techniques described herein may enable these devices that implement a proprietary authorization model to export authorization data stored according to the proprietary authorization model such that this information complies with the vendor-neutral authorization data model. Likewise, the techniques may enable these devices to import authorization data stored in accordance with the vendor-neutral authorization data such that this data complies with a proprietary authorization data model implemented by the importing device. Thus, IF-MAP server 22 may be utilized as an effective intermediate storage device that provides a standardized authorization data model by which to translate to and from for purposes of overcoming interoperability issues that may arise due to differences between vendor-specific authorization data models.

Initially, the administrator may interact with RADIUS server 12 and firewall 14A directly to define translation policies. The administrator may interact directly with these devices in that the administrator locally interacts with a user interface presented by RADIUS server 12 and/or firewall 14A. Alternatively, the administrator may interact with RADIUS server 12 and firewall 14A indirectly via a web-based or other graphical or command line user interface. Often in indirect instances, the administrator remotely accesses RADIUS server 12 and firewall 14A via a web-based graphical user interface to input or otherwise enter data defining one or more translation policies.

As one example, an administrator may direct a computing device, similar to one of endpoint devices 26, to access a web-page or other web-based user interface hosted by RADIUS server 12. The administrator may then, via this web-based user interface, define either an import or export translation policy by which RADIUS server 12 either imports or exports, respectively, authorization information from or to IF-MAP server 22. Typically, RADIUS server 12 acts as a collection point (or, in the terminology of 802.1X, as an authentication device or a policy decision point) that requests authentication information concerning each endpoint device 26 that requests access to enterprise network 16. RADIUS server 12 may receive the above described security credentials and other behavior information in response to a challenge issued either by switch 18 and/or RADIUS server 12. RADIUS server 12 may store authorization information regarding and endpoint in accordance with a proprietary or vendor-specific authorization data model. The administrator may define for these types of devices that collect authentication information an export translation policy via the web-based user interface presented by RADIUS server 12. The export translation policy maps the authorization information or data stored in accordance with the proprietary authorization model from the proprietary authorization model to the cross-vendor or vendor-neutral authorization data model, e.g., the IF-MAP data model.

In addition authentication devices, another class of devices exists. This class of devices may be referred to in the terminology of 801.2X as policy enforcement points or, in the terminology of IF-MAP, as "flow controllers." Policy enforcement points or flow controllers are shown in the example of FIG. 1 as firewalls 14. The administrator may, as another example, interact via a web-based user interface presented by firewall 14A to configure an import translation policy. The import translation policy may map the authorization information stored in accordance with the vendor-neutral authorization data model from the vendor-neutral authorization data model to the vendor-specific or proprietary authorization data model implemented by firewall 14A.

After defining these export and import translation polices, the administrator may enable these devices to implement network access control in accordance with the various network access control techniques discussed above. Switch 18 may, once enabled to implement network access control, challenge those of endpoint devices 26 that request access to enterprise network 16 in accordance with the IEEE 802.1X standard. These endpoint devices 26 may respond with security credentials, e.g., a username and password, entered by corresponding ones of users 28, which switch 18 may forward to RADIUS server 12. In some instances, RADIUS server 12 may also request, in addition to the security credentials, the above-described behavior information. RADIUS server 12 may then authenticate each of those of endpoint devices 26 requesting access to enterprise network 16 based on this collection of information generally referred to as authentication information. If authenticated, RADIUS server 12 may instruct switch 18 to permit those authenticated ones of the requesting endpoint devices 26 access to enterprise network 16.

Meanwhile, RADIUS server 12 may initiate an IF-MAP session in accordance with the IF-MAP protocol or use a previously established IF-MAP session to publish the authorization information based on endpoints it has authenticated. In some instances, RADIUS server 12 may only publish authorization information for endpoint devices 26 that were properly authenticated. In other instances, RADIUS server 12 may publish authorization information for all devices. In any event, RADIUS server 12 may initiate the IF-MAP session with IF-MAP server 22, where the IF-MAP session may comprise a layer four (4) or L4 Transmission Control Protocol (TCP) session over which RADIUS server 12 may perform additional application layer or L7 signaling. RADIUS server 12 may signal channels over the TCP session, such as a Simple Object Access Protocol (SOAP)/HyperText Transfer Protocol Secure (HTTPS) channel. This SOAP/HTTPS channel may represent a Synchronous Send-Receive Channel (SSRC) by which to communicate IF-MAP messages to IF-MAP server 22.

RADIUS server 12 may communicate IF-MAP messages or communications via this SSRC to IF-MAP server 22 and receive messages either via this SSRC or another channel referred to as an Asynchronous Receive Channel (ARC). ARC may be similar to SSRC except that the IF-MAP server may wait until poll results are available to RADIUS server 12 before sending responses to RADIUS server 12 in order to provide timely notification to RADIUS server 12. RADIUS server 12 may, upon initiating this IF-MAP session to publish the authorization information concerning one of endpoint devices 26, invoke or otherwise apply the export translation policy specified by the administrator to translate the authorization information stored in accordance with the first proprietary authorization model implemented by RADIUS server 12 from the first proprietary authorization data model to the vendor-neutral IF-MAP authorization data model. RADIUS server 12 may apply this export translation policy to generate translated authorization information that complies with the vendor-neutral IF-MAP authorization data model.

RADIUS server 12 may then generate a publish IF-MAP message that includes this translated authorization information and transmit this publish IF-MAP message to IF-MAP server 22. FIG. 1 illustrates the transmission of the translated authorization information as publish IF-MAP message 30. IF-MAP server 22 may receive publish IF-MAP message 30 and publish the translated authorization information to a database or other memory or storage device, which may store this authorization information in accordance with the vendor-neutral or cross-vendor IF-MAP authorization data model.

Those of endpoint devices 26 requesting access to enterprise network 16 may, after being successfully authenticated, gain access to enterprise network 16. Enterprise network 16 however may implement further network access control in the form of firewalls 14, which may permit or deny access to respective ones of resources servers 24 based on authorization information derived at the collection points. Firewalls 14 may also establish IF-MAP sessions by which to search, subscribe to and poll authorization information stored within IF-MAP server 22. Firewalls 14 may receive authorization information via response IF-MAP messages 32A-32N and determine whether to permit or deny access based on the received authorization information.

Firewall 14A may, for example, receive network traffic from endpoint device 26A via switch 18 and router 20, assuming that endpoint device 26A was successfully authenticated and granted permission to access enterprise network 16 by RADIUS server 12. Assuming such authentication and permission was granted, RADIUS server 12 may publish authorization information 30 concerning endpoint device 26A. Upon receiving this network traffic, firewall 14A may parse a header of a packet of this network traffic to determine a source of this traffic, e.g., a source Internet Protocol address, and establish an IF-MAP session or use a previously established IF-MAP connection by which to communicate a search IF-MAP message to IF-MAP server 22 requesting, as one example, any authorization information associated with the parsed source IP address. Notably, IF-MAP searches are not limited to IP address and a search IF-MAP message may define a search such that any portion of authorization information delineated by the vendor-neutral IF-MAP data model may be located and returned by IF-MAP server 22. IF-MAP server 22 may respond with a response IF-MAP message 32A that includes any authorization information associated with the identified source IP address. As IF-MAP server 22 implements the vendor-neutral IF-MAP authorization data model, the authorization information received by firewall 14A via response IF-MAP message 32A complies with the vendor-neutral IF-MAP authorization data model.

Upon receiving this authorization information that complies with the vendor-neutral IF-MAP authorization data model, firewall 14A may invoke the import translation policy defined by the administrator in the manner described above to translate the authorization information that complies with the vendor-neutral IF-MAP authorization data model from the vendor-neutral IF-MAP authorization data model to the second proprietary or vendor-specific authorization data model implemented by firewall 14A. Firewall 14A may store data defining or otherwise maintain admission control policies which firewall 14A may apply to this translated authorization information that complies with the second proprietary or vendor-specific authorization data model. The admission control policy may consider both the network traffic, e.g., one or more packets of a given packet flow, as well as the translated authorization information. Firewall 14A may then grant or deny the network traffic access to the intended destination, e.g., one or more of resource servers 24, of the network traffic received from endpoint device 26A based on the application of the admission control policy.

RADIUS server 12 may, in accordance with TNC, continually receive health and other behavior information for the duration of the access of enterprise network 16 by endpoint device 26A. RADIUS server 12 may update the authorization information stored in accordance with the first authorization information associated with endpoint device 26A in response to any detected changes in the behavior information. RADIUS server 12 may also update authorization information stored in accordance with the vendor-neutral IF-MAP authorization information within IF-MAP server 22 in response to detecting a change in the behavior or other information. RADIUS server 12 may again translate this updated authorization information in the manner described above and publish this updated authorization information via publish IF-MAP message 30, also in the manner described above.

To enable authorization information consumers, such as firewall 14A, to keep up-to-date on any changes to authorization information, the IF-MAP protocol provides for both the subscribe and poll IF-MAP messages. Firewall 14A may, when first receiving network traffic from an unknown or new supplicant device, such as endpoint device 26A, generate a subscribe IF-MAP message that identifies endpoint device 26A, e.g., by way of source IP address, for which firewall 14A may require regular updates concerning changes to authorization information. In effect, the subscribe IF-MAP message may define a persistent search that IF-MAP server 22 maintains and performs in response to a poll IF-MAP message.

IF-MAP server 22 may, in response to this subscribe IF-MAP message, store this persistent search. Firewall 14A may then generate and transmit a poll IF-MAP message that identifies the subscription to which IF-MAP server 22 may respond by generating response IF-MAP message 32A with authorization information. IF-MAP server 22 does not respond to the poll message from Firewall 14A until the authorization information associated with the subscription changes. In this way, Firewall 14A is notified in real time when authorization information changes. Firewall 14A may apply the above-described import translation policy in the manner described above in order to properly apply the admission control policies.

In this manner, the translation techniques enable devices that implement network access control in accordance with different authorization models to interoperate and moreover cooperate when performing network access control. Rather than limit implementation of network access control to only homogeneous network devices from the same vendor, heterogeneous network devices from different vendors that implement different authorization data models may utilize the techniques described herein to translate authorization information between a proprietary data model and a vendor-neutral, cross-vendor and standard authorization data model. Not only may the techniques improve network access control by facilitating interoperability between heterogeneous network devices that implement network access control, but the techniques may also free enterprises from vendor-specific network access control strategies that limit adoption of potentially beneficial network access control techniques. Moreover, the techniques may preserve previous developments by vendors to provide secure authorization models while enabling interoperability between disparate devices from different vendors. In this respect, the techniques may promote both security and interoperability.

Figure 2A:
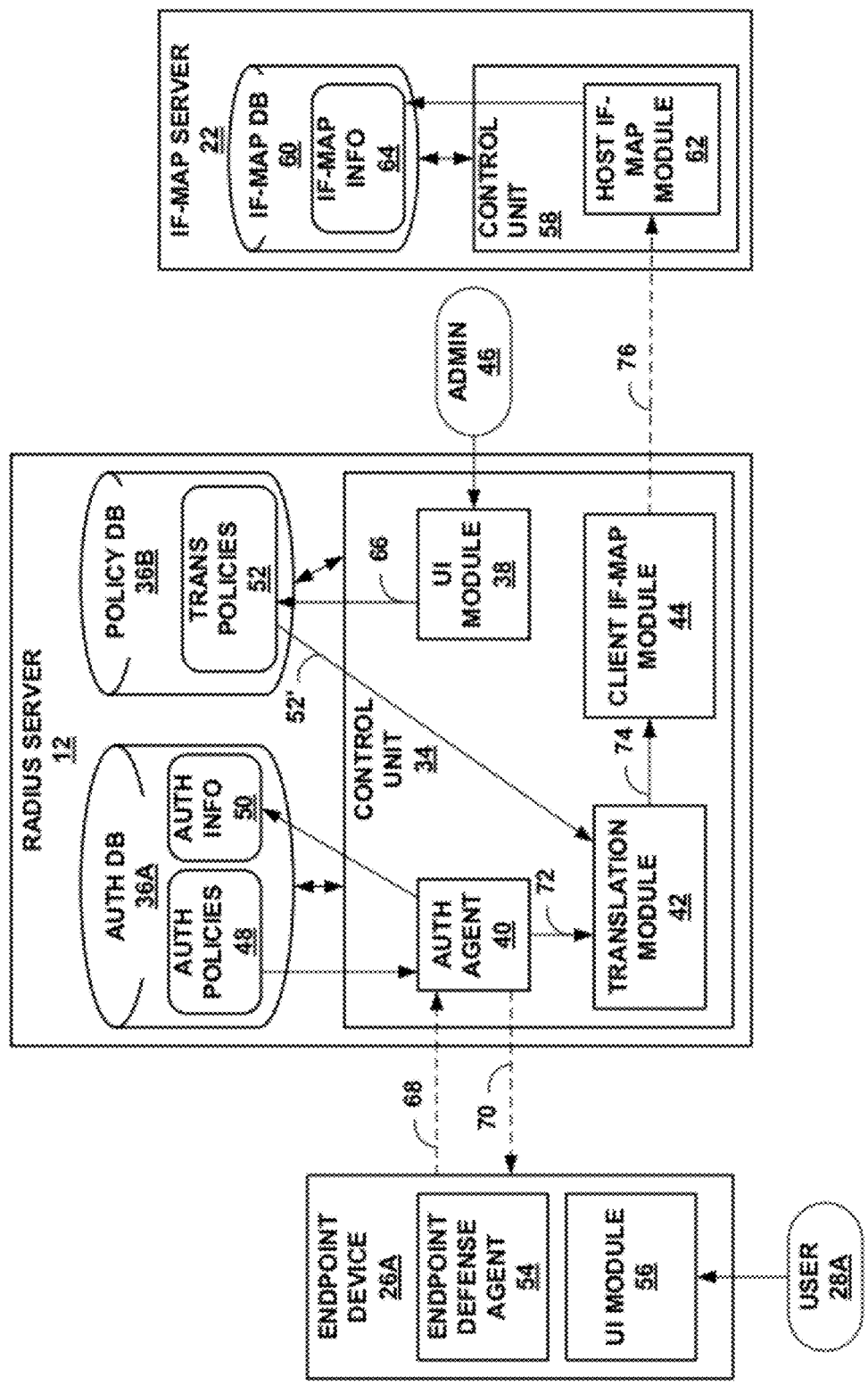
FIGS. 2A and 2B are block diagrams illustrating in more detail an example embodiment of each of an authentication device and a network security device of FIG. 1 in implementing the translation techniques described in this disclosure.
Figure 2B:
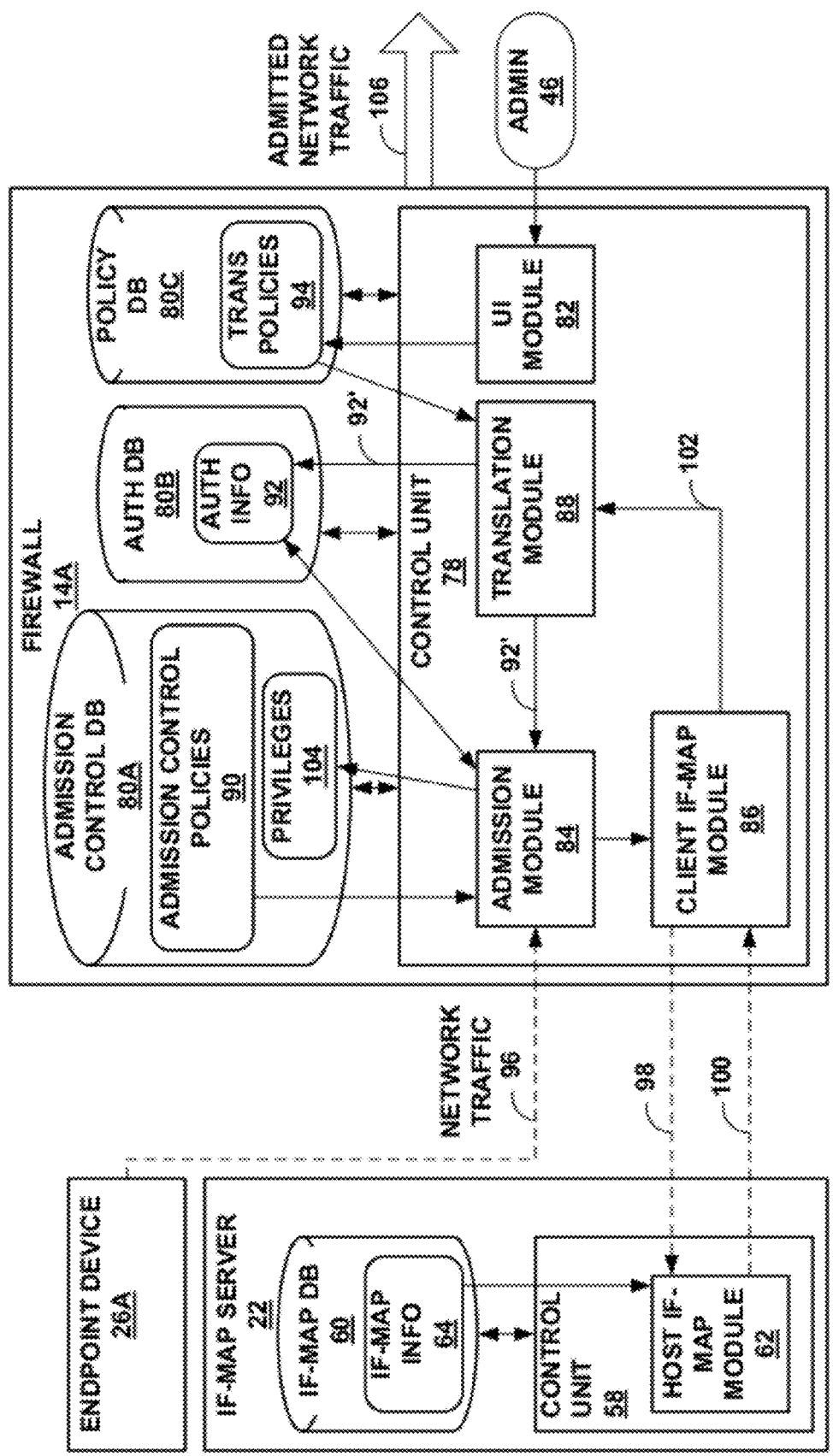

FIGS. 2A and 2B are block diagrams illustrating in more detail an example embodiment of each of RADIUS server 12 and firewall 14A of FIG. 1 in implementing the translation techniques described in this disclosure. FIG. 2A is a block diagram illustrating an example embodiment of RADIUS server 12 in implementing an export aspect of the translation techniques described in this disclosure. FIG. 2B is a block diagram illustrating an example embodiment of firewall 14A in implementing an import aspect of the translation techniques described in this disclosure. Again, while described with respect to particular network devices, RADIUS server 12 and firewall 14A, any network device may implement the translation techniques described herein.

As shown in the example of FIG. 2A, RADIUS server 12 includes a control unit 34 and two databases 36, an authorization database 36A ("auth DB 36A") and a policy database 36B ("policy DB 36B"). Control unit 34 may comprise one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (e.g., a Flash memory, random access memory or RAM) or any other type of volatile or non-volatile memory that stores instructions (e.g., in the form of a computer program or other executable) to cause a programmable processor to perform the techniques described herein. Alternatively, control unit 34 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described herein.

Control unit 34 may include a plurality of modules, agents, units, elements, engines or any combination thereof that each represents either hardware, software or a combination of both hardware and software. In the example of FIG. 2A, control unit 34 includes a user interface module 38 ("UI module 38"), an authentication agent 40 ("auth agent 40"), a translation module 42, and a client IF-MAP module 44. User interface module 38 may represent a hardware and/or software module that presents user interfaces with which an administrator, such as administrator 46 ("admin 46"), may interact to enter data or other input to RADIUS server 12. Authentication agent 40 may represent a hardware and/or software module that implements network access control techniques to receive authentication information and authenticate the received authentication information. Authentication agent 40 may implement this network access control in accordance with the IEEE 802.1X port-based network access control standard.

Translation module 42 may represent a hardware and/or software module that implements the translation techniques described in this disclosure. Translation module 42 may translate authorization information that complies with either a vendor-specific or vendor-neutral authorization model from the either vendor-specific or vendor-neutral authorization model to a vendor-neutral or vendor-specific authorization model respectively. Client IF-MAP module 44 may represent a hardware and/or software module that implements IF-MAP protocol to establish a session with IF-MAP server 22 over which client IF-MAP module 44 may issue publish, search, subscribe, and poll IF-MAP messages in order to publish and generally retrieve authorization information. Client IF-MAP module 44 may, in effect, provide an interface by which RADIUS server 12 may interact with IF-MAP server 22.

Databases 36 may comprise a storage device, such as a hard drive, or memory, such as RAM, that stores data. While shown as separate databases 36, each of databases 36 may be implemented as a single physical database that stores data relevant to both databases 36 shown separately in FIG. 2A. Authorization database 36A stores data defining both authentication policies 48 and authorization information 50. Policy database 36B stores data defining translation policies 52 ("trans policies 52"), which are described below in more detail. Authentication policies 48 may each comprise data defining rules by which to authenticate endpoint devices based on authentication received from the endpoint devices. Authentication policies 48 may correspond to or otherwise require authentication information organized according to a particular format, as specified by the authorization data model. In other words, authorization policies 48 may be vendor-specific insomuch that authentication policies 48 may define rules for authenticating authentication information stored in accordance with a particular authorization data model. Authorization information 50 may comprise data stored in accordance with a vendor-specific authorization data model.

An authorization data model may define a plurality of classes or other distinct groupings of data to which authorization information from endpoint devices is classified. For example, a vendor-specific authorization data model may define three different classes of authorization information. The first exemplary class may be referred to as a "user" class to which user-specific authorization information is classified. The second exemplary class may be referred to as a "health" class to which health- or behavior-specific authorization information is classified. The third exemplary class may be referred to as a "capability" class to which a given authorization level is classified. Information determined after authenticating an endpoint device may be classified to this authorization class. For example, after authenticating an endpoint device, authentication agent 40 may determine through application of one or more authentication policies 48 one or more permissions to access different network resources within enterprise network 16 and store these permissions within the authorization class.

To properly evaluate received authentication information, authentication agent 40 may first classify the authorization information to the vendor-specific classes. By so classifying the authorization information in this manner, authentication agent 40 may apply authentication policies 48, which depend on this classification to properly assess the authentication information. Authentication agent 40 may store authorization information 50 for comparison purposes. Authentication agent 40 may store this authorization information in accordance with the vendor-specific authentication data model. Authentication agent 40 may store this authorization information 50 only for currently connected and authenticated ones of endpoint devices 26 or for all endpoint devices 26 that request access to enterprise network 16 regardless of authentication or current status of connection to enterprise network 16.

As further shown in the example of FIG. 2A, endpoint device 26A may comprise an endpoint defense agent 54 and a user interface module 56 ("UI module 56"). Endpoint defense agent 54 may comprise hardware and/or software that reports behavior information or other health-status information to authentication agent 40 of RADIUS server 12. More information regarding endpoint defense agent 54, authentication agent 40 and the trusted platform model in general can be found in U.S. patent application Ser. No. 11/772,469, titled "Accessing a Policy Server from Multiple Layer Two Networks," with inventors Roger A. Chickering et al., filed Jul. 2, 2007, the entire contents of which are herein incorporated by reference as if set forth in their entirety. User interface module 56 may represent hardware and/or software with which a user 28A may interact to enter data or otherwise control and direct endpoint device 26A.

Also shown in the example of FIG. 2A is an example embodiment of IF-MAP server 22, which includes a control unit 58 and an IF-MAP database ("IF-MAP DB 60"). Control unit 58 may be similar to control unit 34, however control unit 58 may implement or otherwise execute different modules, agents, units, elements and engines than those implemented and/or executed by control unit 34. Control unit 58 may include a host IF-MAP module 62 that implements the IF-MAP protocol described above to maintain IF-MAP sessions with client IF-MAP modules, such as client IF-MAP module 44, receive the IF-MAP communications via the IF-MAP sessions, and respond to these received IF-MAP communications via IF-MAP response messages. IF-MAP database 60 may represent a storage device or memory that stores data and, more particularly, authorization information in accordance with the cross-vendor or vendor-neutral IF-MAP data model. This authorization information stored in accordance with the IF-MAP data model in shown in FIG. 2A as IF-MAP information 64 ("IF-MAP info 64").

IF-MAP information 64 may comprise metadata about systems and users currently connected to enterprise network 16. IF-MAP information 64 may comprise information or data identifying one or more of a Media Access Control (MAC) address, an IP address, a port on a switch (e.g., switch 18), Virtual Local Area Network (VLAN) numbers, bindings between IPv4 or IPv6 addresses and MAC addresses, a security event (e.g., an Intrusion Detection System (IDS) alert, botnet or worm infections, behavior or traffic changes, policy violations, or peer-to-peer traffic), device attributes (e.g., operating system or other software patch status or firewall policy information), authentication information (e.g., who authenticated the endpoint device and how the endpoint device was authenticated), and access request information (e.g., an IP or MAC addresses of an endpoint device attempting to log into enterprise network 16). IF-MAP information 64 may comprise a graph data structure that stores this information in one or more interconnected nodes. The graph data structure therefore, in effect, defines and represents a network access control topology that identifies via authorization information those of endpoint devices 26 currently connected to enterprise network 16.

IF-MAP information 64 may be stored in accordance with the IF-MAP data model, which also defines a plurality of classes by which to classify or otherwise organize authorization information. For example, the IF-MAP data model includes "identity," "capability," and "device-attribute" classes. The "identity" class may classify information about users operating endpoints accessing the network. The "capability" class may classify authorization information or information describing permissions. The "device-attributes" class may classify health or other behavior information.

Initially, admin 46 may interact with a user interface presented by UI module 38 of RADIUS server 12 to enter data or input defining one or more of translation policies 52. Often, as described above, admin 46 may enter data defining an export translation policy of translation policies 52, as RADIUS server 12 acts as an authorization information collection point that exports authorization information to IF-MAP server 22. With respect to an export translation policy of translation policies 52, admin 46 may enter data defining rules for mapping the above set of classes defined by the vendor-specific authorization data model to the vendor-neutral IF-MAP authorization data model.

For example, admin 46 may enter data defining rules for the mapping authorization information between the two authorization data models in accordance with the following Table 1:

TABLE 1

| Vendor-Specific | Vendor-Neutral (IF-MAP) |
|---|---|
| User Class | Identity Class |
| Health Class | Device Attributes Class |
| Authorization Class | Capabilities Class |

As shown in Table 1, admin 46 may enter data defining rules for mapping authorization information classified as belonging to the user class of the vendor-specific data model to the identity of the vendor-neutral IF-MAP data model. Likewise, admin 46 may enter data defining rules for mapping authorization information from the health and authorization class of the vendor-specific authorization model to the respective device-attributes and capabilities of the vendor-neutral IF-MAP data model. UI module 38 may receive this data 66 and store this data 66 as one or more of translation policies 52. Admin 46 may then enable RADIUS server 12 to export or import authorization information to and from IF-MAP server 22.

RADIUS server 12 may then receive authentication information 68 from endpoint device 26A in response to a challenge by a policy enforcement point, such as switch 18, or RADIUS server 12. User 28A may enter via UI module 56 security credentials and other information and endpoint device 26A may forward these security credentials and other information to authentication agent 40 as authentication information 68. Endpoint defense agent 54 of endpoint device 26A may also forward behavior and other information to authentication agent 40 also as authentication information 68. Authentication agent 40 may receive this authentication information 68 from endpoint device 68A and process this authentication information so as to comply with the vendor-specific authorization data model described above. Authentication agent 40 may then apply authentication policies 48 to classified authorization information 68 in order to authenticate both user 28A and/or endpoint device 26A. Authentication agent 40 may store this authorization information 68 as authorization information 50 within authorization database 36A.

Based on the application of authentication policies 48, authentication agent 40 may grant or deny endpoint device 26A permission to access network 16. Authentication agent 40 may grant more than one permission or may assign a level of permission to endpoint device 26A such that endpoint device 26A may only access portions of enterprise network 16. Authentication agent 40 may store this authorization information describing this permissions or level of permission to authorization database 36A as authorization information 50 as well. Authentication agent 40 may first classify this authorization information to the authorization class before storing this information to authorization database 36A. In any event, assuming successful authentication, authentication agent 40 issues a grant message 70 to endpoint device 26A or more likely a policy enforcement point, such as switch 18, that enables endpoint device 26A to access enterprise network 16.

After successfully authenticating endpoint device 26A, authentication agent 40 may publish authorization information 50 pertaining to endpoint device 26A, as well as any other information relevant to authenticating endpoint device 26A. Authentication agent 40 may cause client IF-MAP module 44 to initiate an IF-MAP session if one has not been previously established. Authentication agent 40 may forward this authorization information 72 corresponding to endpoint device 26A to translation module 42. Notably, authorization information 72 complies with the vendor-specific authorization data model. Translation module 42 may apply the export translation policy described above by first accessing policies 52 and retrieving this export translation policy 52' from translation policies 52 stored to policy DB 36B. Translation module 42 may apply export translation policy 52' to translate authorization information 72 stored in accordance with the vendor-specific authorization model from the vendor-specific authorization data model to authorization information that complies with the vendor-neutral authorization data model. Translation module 42 may perform this translation by applying the mapping rules defined by policy 52' to translate authorization information 72 classified to each of the vendor-specific classes to re-classify this information 72 to its vendor-neutral representation.

Translation module 42 may generate and forward resulting translated authorization information 74 to client IF-MAP module 44. Client IF-MAP module 44 may have previously established an IF-MAP session between client IF-MAP module 44 and host IF-MAP module 62. Client IF-MAP module 44, in response to receiving translated authorization information 74, may generate a publish IF-MAP message that includes the translated authorization information 74 and forward this publish IF-MAP message 76 to host IF-MAP module 62. Host IF-MAP module 62 publishes translated authorization information 74 to IF-MAP information 64 in response to receiving publish IF-MAP message 76. In this manner, RADIUS server 12 may implement the export translation techniques to publish authorization information originally classified in accordance with a vendor-specific or proprietary authorization data model as translated authorization information that complies with a vendor-neutral IF-MAP authorization data model.

While described above as implementing the export aspect of the translation techniques, RADIUS server 12 may also implement the import translation techniques described below with respect to firewall 14A of FIG. 2B. Likewise, while firewall 14A may perform the import translation techniques described above with respect to RADIUS server 12, firewall 14A may also perform the export translation techniques described above with respect to RADIUS server 12. However, for ease of illustration purposes, the import and export aspects of the techniques are described with respect to RADIUS server 12 and firewall 14A, respectively. For this reason, the import translation techniques are described with respect to firewall 14A as shown in more detail in FIG. 2B.

Referring to the example of FIG. 2B, firewall 14A may include a control unit 78 and three databases 80, an admission control database 80A ("admission control DB 80A"), an authorization database 80B ("auth DB 80B") and a policy database 80C ("policy DB 80C"). Control unit 78 may be substantially similar to control unit 34 described above with respect to RADIUS server 12. Control unit 78 includes a user interface module 82 ("UI module 82"), an admission module 84, a client IF-MAP module 86 and a translation module 88.

UI module 82 may be substantially similar to UI module 38 in that UI module 82 may present a user interface to receive input or data from admin 46 defining translation policies. Admission module 84 may represent hardware and/or software that receives network traffic and determines whether to admit or deny the network traffic access to protected network resources, e.g., resource servers 24A-24M (as shown in FIG. 1). Client IF-MAP module 86 may be substantially similar to client IF-MAP module 44 described above with respect to RADIUS server 12. Translation module 88 may also be substantially similar to translation module 42 described above with respect to RADIUS server 12.

Databases 80 may comprise a storage device, such as a hard drive, or memory, such as RAM, that stores data. While shown as separate databases 80, each of databases 80 may be implemented as a single physical database that stores data relevant to each of databases 80 shown separately in FIG. 2B. Admission control DB 80A stores data defining admission control policies 90. Admission control policies 90 may each define one or more rules by which to determine whether to admit or deny network traffic access to protected network resources, e.g., resource servers 24A-24M. The rules of each one of admission control policies 90 may base this determination on information extracted from packets of the network traffic as well as authorization information corresponding to an endpoint device that originates this network traffic.

Authorization database 80B may locally store data defining this authorization information 92 in accordance with a vendor-specific authorization data model. In this respect, authorization database 80B may be similar to authorization database 36A, however the authorization data model by which authorization information 92 is stored may be different from the authorization data model by which authorization information 50 is stored. To differentiate between the two, the data model implemented by RADIUS server 12 may be referred to as a first vendor-specific authorization data model, and the data model implemented by firewall 14A may be referred to as a second vendor-specific authorization data model. Policy database 80C may be substantially similar to policy database 36B of RADIUS server 12 in that policy database 80C also stores translation polices 94 that may be similar to translation policies 52 stored within policy database 36B. Translation policies 94 however may comprise both import and export translation policies, but as described above, only import ones of translation policies 94 are described herein with respect to firewall 14A. Thus, translation policies 94 may be referred to as import translation policies 94.

Initially, admin 46 may interact with firewall 14A via a user interface presented by UI module 82 to enter data defining translation policies 94. Admin 46 may define rules similar to those shown above with respect to Table 1 except that these rules may map from the vendor-neutral IF-MAP data model to the second vendor-specific authorization data model implemented by firewall 14A. In other words, the rules provide a mapping that acts inversely to those shown above in Table 1, as the rules relate to an import not an export of one of translation policies 94. In any event, after installing or otherwise entering data defining translation policies 94, admin 46 may enable or otherwise cause firewall 14A to receive network traffic.

In the example of FIG. 2B, firewall 14A is shown to receive network traffic 96 from endpoint device 26A. Network traffic 96 may comprise one or more packets or other discrete data units. These packets may comprise IP packets that include a packet header defining a so-called "five-tuple." The five-tuple refers to five different data fields that store an IP source address, an IP destination address, an IP source port, an IP destination port and a protocol (or protocol identifier). Admission module 84 may receive network traffic 96 and parse the five-tuple from each packet header defined by each corresponding packet. Based on this five-tuple, admission module 84 may identify a source IP address associated with endpoint device 26A.

Admission module 84 may access authorization information 92 to retrieve authorization information associated with the source IP address (or, more generally, endpoint device 26A). If authorization DB 80B does not store authorization information 92 that corresponds to endpoint device 26A, admission module 84 may issue a request for authorization information corresponding to endpoint device 26A to client IF-MAP module 86 or otherwise invoke or cause client IF-MAP module 86 to retrieve this authorization information from IF-MAP server 22. Client IF-MAP module 86 may establish an IF-MAP session with host IF-MAP module 62 in the manner described above and may generate and issue a search IF-MAP message 98 via the IF-MAP session to host IF-MAP module 62. Client IF-MAP module 86 may generate search IF-MAP message 98 to request any authorization information associated with the determined source IP address that corresponds to endpoint device 26A. While described with respect to a source IP address, admission module 84 may generate and issue or transmit a search IF-MAP message 98 that searches for authorization information using any determinable criteria or information stored to one of the packets of network traffic 96, such as a MAC address. The techniques therefore should not be limited to source IP address searches but may be implemented with respect to any form of search criteria.

In response to search IF-MAP message 98, host IF-MAP module 62 may search the graph data structure storing IF-MAP information 64 for the source IP address identified by search IF-MAP message 98. Host IF-MAP module 62 may then return any portions of IF-MAP information 64 that relates to the source IP address associated with endpoint device 26A via a response IF-MAP message 100.

As this authorization information defined within response IF-MAP message 100 is defined or classified in accordance with the vendor-neutral IF-MAP authorization data model, client IF-MAP module 86 may upon parsing this authorization information forward this vendor-neutral authorization information 102 to translation module 88. Translation module 88 may then apply one or more of import translation policies 94 to map the vendor-neutral authorization information 102 defined or classified in accordance with the vendor-neutral IF-MAP authorization model from the vendor-neutral IF-MAP authorization model to the second vendor-specific authorization data model implemented by firewall 14A. Translation module 88 may in other words reclassify authorization information 102 in accordance with the vendor-specific authorization data model implemented by firewall 14A by accessing policy database 80C to retrieve an appropriate one or more of import translation policies 94 and then applying these one or more of policies 94 to authorization information 102. Translation module 88 may output this reclassified authorization information as translated authorization information 92' to admission module 84 while possibly also storing this translated authorization information 92' to authorization database 80B as authorization information 92.

Admission module 84, upon receiving authorization information 92', may access admission control database 80A to retrieve one or more appropriate ones of admission control policies 90 and apply these one or more of admission control policies 90 to grant or deny network traffic 96 access to the protected network resources. In some instances, admission module 84 may grant one or more privileges 104 that grant or deny access to one or more protected network resources, e.g., one or more of resource servers 24A-24M. Admission module 84 may store these privileges 104 to admission control database 80A for use in granting or denying traffic received subsequent to the current traffic. These privileges 104 may speed admission control in that admission module 84 may quickly access these privileges 104 stored for each endpoint device currently admitted to access the protected network resources.

Thus, if admission module 84 determines that authorization database 80B stores authorizing information 92 associated with endpoint device 26A, admission module 84 may next access privileges 104 to determine whether any privileges 104 correspond to the source IP address parsed from the one or more packets of network traffic 96. Admission module 84 may therefore store these privileges 104 to a table data structure or any other data structure by source IP address or any other unique identifier by which to associate privileges 104 to endpoint devices 26A.

In order to ensure that authorization information 92 is up to date, client IF-MAP module 86 may issue a subscribe request to IF-MAP server 22 rather than a search request. This instructs IF-MAP server 22 to inform client IF-MAP module 86 in real time via the ARC whenever any change to the authorization data pertinent to the search changes. This enables firewall 14A to keep authorization information 92 up to date in real time. As changes to the authorization information for a particular endpoint are made, firewall 14 may, by keeping this information 14 up to date, take into account these changes when the next packet is received from endpoint 27A.

In any event, upon successfully granting privileges 104 to or otherwise determining privileges 104 associated with endpoint device 26A, control unit 78 may forward this network traffic 96 in accordance with those of privileges 104 associated with endpoint device 26A. Control unit 78 may include various forwarding modules (not shown in FIG. 2B) to forward this network traffic 96 or portions thereof as admitted network traffic 106.

Figure 3A:
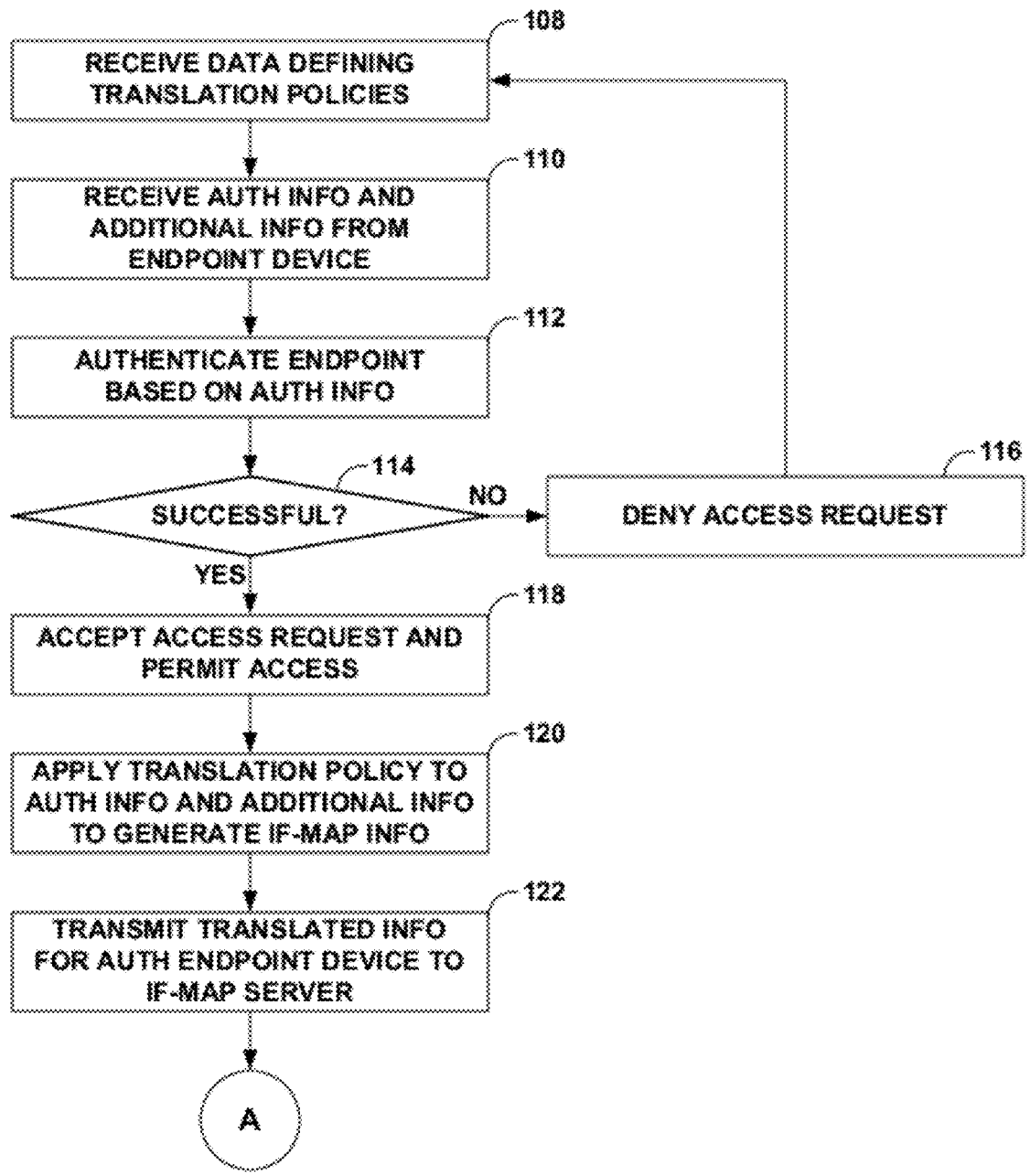
FIGS. 3A and 3B are flowcharts illustrating an operation of network devices in implementing the techniques described in this disclosure.
Figure 3B:
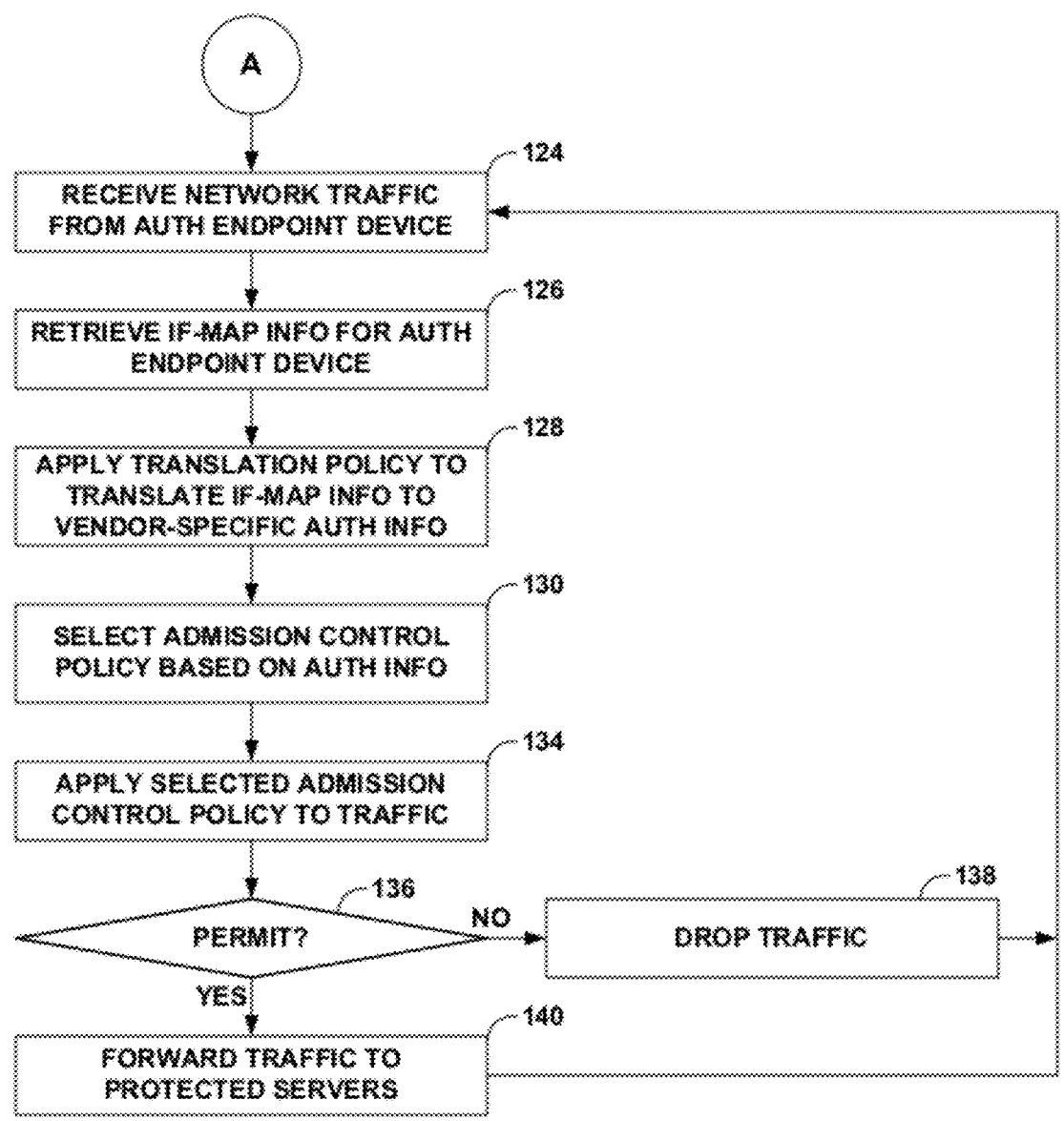

FIGS. 3A and 3B are flowcharts illustrating an operation of a network, such as enterprise network 16 of FIG. 1, in implementing the techniques described in this disclosure. More particularly, FIG. 3A is a flowchart illustrating example operation of an authentication device, such as RADIUS server 12 of FIG. 2A, in implementing an export aspect of the techniques described herein. FIG. 3B is a flowchart illustrating example operation of a network security device, such as firewall 14A of FIG. 2B, in implementing an import aspect of the techniques set forth in this disclosure.

Referring to the example of FIG. 3A, RADIUS server 12 and, more specifically, control unit 34 of RADIUS server 12, may invoke UI module 38 to present a user interface with which admin 46 may interact to enter data defining translation policies 52, as described above (108). Admin 46 may then activate or otherwise enable RADIUS server 12 to begin receiving access requests, whereupon, authentication agent 40 may receive authentication information 68 from endpoint device 26A in response to a challenge by a policy enforcement point, such as switch 18, or RADIUS server 12 in the manner described above (110).

Authentication agent 40 may receive this authentication information 68 from endpoint device 68A. Authentication agent 40 may then apply authentication policies 48 to classified authentication information 68 in order to authenticate both user 28A and/or endpoint device 26A (112). Authentication agent 40 may store and use this authentication information 68 in conjunction with authentication policies 48 to generate authorization information 50 within authorization database 36A.

Based on the application of authentication policies 48, authentication agent 40 may grant or deny endpoint device 26A permission to access network 16. In other words, authentication agent 40 may determine whether the authentication was successful (114). If not successful ("NO" 114), authentication agent 40 may refuse to grant endpoint device 28A permission to access network 16, thereby denying the access request by endpoint device 26A (116). However, if successful ("YES" 114), authentication agent 40 may grant more than one permission or assign a level of permission to endpoint device 26A such that endpoint device 26A may only access portions of enterprise network 16. Authentication agent 40 may store this authorization information describing this permission or level of permission to authorization database 36A as authorization information 50 as well. Assuming successful authentication, authentication agent 40 issues a grant message 70 to endpoint device 26A or more likely a policy enforcement point, such as switch 18, that enables endpoint device 26A to access enterprise network 16 (118).

After successfully authenticating endpoint device 26A, authentication agent 40 may publish authorization information 50 collected from endpoint device 26A, as well as any other information relevant to authenticating endpoint device 26A. Authentication agent 40 may cause client IF-MAP module 44 to initiate an IF-MAP session if one has not been previously established. Authentication agent 40 may forward this authorization information 72 corresponding to endpoint device 26A to translation module 42. Notably, authorization information 72 complies with the vendor-specific authorization data model. Translation module 42 may apply the export translation policy described above by first accessing policies 52 and retrieving this export translation policy 52' from translation policies 52 stored to policy DB 36B. Translation module 42 may apply export translation policy 52' to translate authorization information 72 stored in accordance with the vendor-specific authorization model from the vendor-specific authorization data model to authorization information that complies with the vendor-neutral authorization data model as described above (120).

Translation module 42 may generate and forward resulting translated authorization information 74 to client IF-MAP module 44. Client IF-MAP module 44 may have previously established an IF-MAP session between client IF-MAP module 44 and host IF-MAP module 62. Client IF-MAP module 44, in response to receiving translated authorization information 74, may generate a publish IF-MAP message that includes the translated authorization information 74 and forwards this publish IF-MAP message 76 to host IF-MAP module 62 (122). Host IF-MAP module 62 publishes translated authorization information 74 to IF-MAP information 64 in response to receiving publish IF-MAP message 76. In this manner, RADIUS server 12 may implement the export translation techniques to publish authorization information originally classified in accordance with a vendor-specific or proprietary authorization data model as translated authorization information that complies with a vendor-neutral IF-MAP authorization data model.

Referring to the example of FIG. 3B, admin 46 may, although not shown in the example of FIG. 3B, interact with firewall 14A via a user interface presented by UI module 82 to enter data defining translation policies 94. After installing or otherwise entering data defining translation policies 94, admin 46 may enable or otherwise cause firewall 14A to receive network traffic from an authenticated endpoint device, such as endpoint device 26A (124). Admission module 84 may receive network traffic 96 and parse the five-tuple from each packet header defined by each corresponding packet of the network traffic. Based on this five-tuple, admission module 84 may identify a source IP address associated with endpoint device 26A.

Admission module 84 may access authorization information 92 to retrieve authorization information associated with the source IP address (or, more generally, endpoint device 26A). If authorization DB 80B does not store authorization information 92 that corresponds to endpoint device 26A, admission module 84 may issue a request for authorization information corresponding to endpoint device 26A to client IF-MAP module 86 or otherwise invoke or cause client IF-MAP module 86 to retrieve this authorization information from IF-MAP server 22, as described above (126).

Client IF-MAP module 86 may establish an IF-MAP session with host IF-MAP module 62 in the manner described above and may generate and issue a search IF-MAP message 98 via the IF-MAP session to host IF-MAP module 62. Client IF-MAP module 86 may generate search IF-MAP message 98 to request any authorization information associated with the determined source IP address that corresponds to endpoint device 26A. In response to search IF-MAP message 98, host IF-MAP module 62 may search the graph data structure storing IF-MAP information 64 for the source IP address identified by search IF-MAP message 98. Host IF-MAP module 62 may then return any portions of IF-MAP information 64 that relates to the source IP address associated with endpoint device 26A via a response IF-MAP message 100.

As this authorization information defined within response IF-MAP message 100 is defined or classified in accordance with the vendor-neutral IF-MAP authorization data model, client IF-MAP module 86 may, upon parsing this authorization information, forward this vendor-neutral authorization information 102 to translation module 88. Translation module 88 may then apply one or more of import translation policies 94 to map or translate the vendor-neutral authorization information 102 defined or classified in accordance with the vendor-neutral IF-MAP authorization model from the vendor-neutral IF-MAP authorization model to the second vendor-specific authorization data model implemented by firewall 14A (128). Translation module 88 may output this reclassified authorization information as translated authorization information 92' to admission module 84 while possibly also storing this translated authorization information 92' to authorization database 80B as authorization information 92.

Admission module 84, upon receiving authorization information 92', may access admission control database 80A to retrieve or select one or more appropriate ones of admission control policies 90 and apply these one or more of admission control policies 90 to grant or deny network traffic 96 access to the protected network resources, as described above (130, 134). Based on the application of the selected ones of admission control policies 90, admission module 84 may determine whether to permit the received network traffic access to the protected network resources (136). If application of these ones of policies 90 indicates that the network traffic is denied access ("NO" 136), admission module 84 may drop or cause a forwarding component or other component of firewall 14A to drop the network traffic (138). If application of these ones of policies 90, however, results in granting one or more of privileges 104 to endpoint device 26A that permit access to the protected resources ("YES" 136), admission module 84 may enable or otherwise cause a forwarding component of firewall 14A to forward the network traffic to the protected servers or other network resources as permitted or admitted network traffic 106 (140).

Figure 4A:
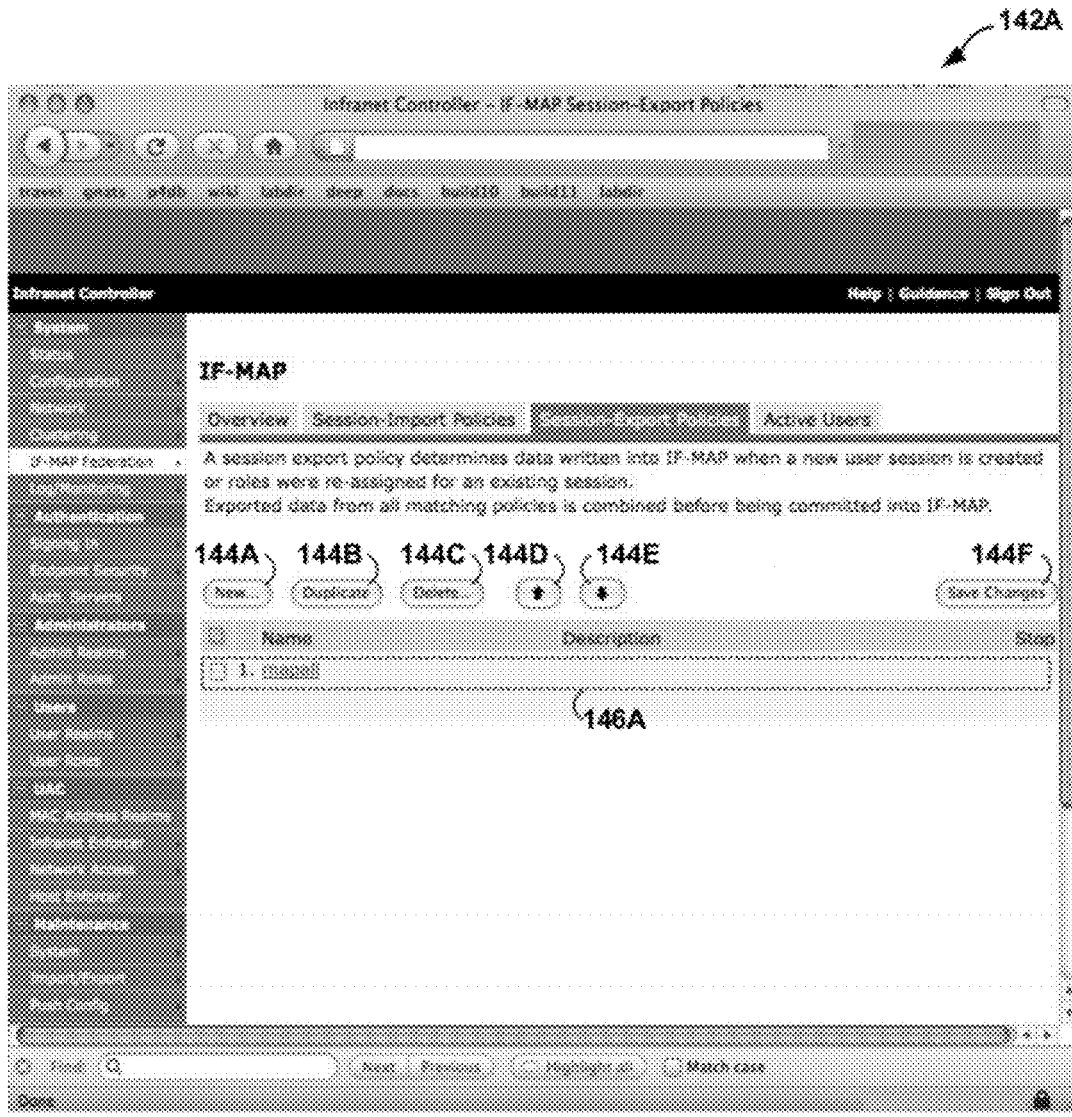
FIGS. 4A-4D are screenshots illustrating example user interfaces that one or more network devices that implement the techniques described herein may present in order to facilitate entering data to define, edit, update and view translation policies.
Figure 4B:
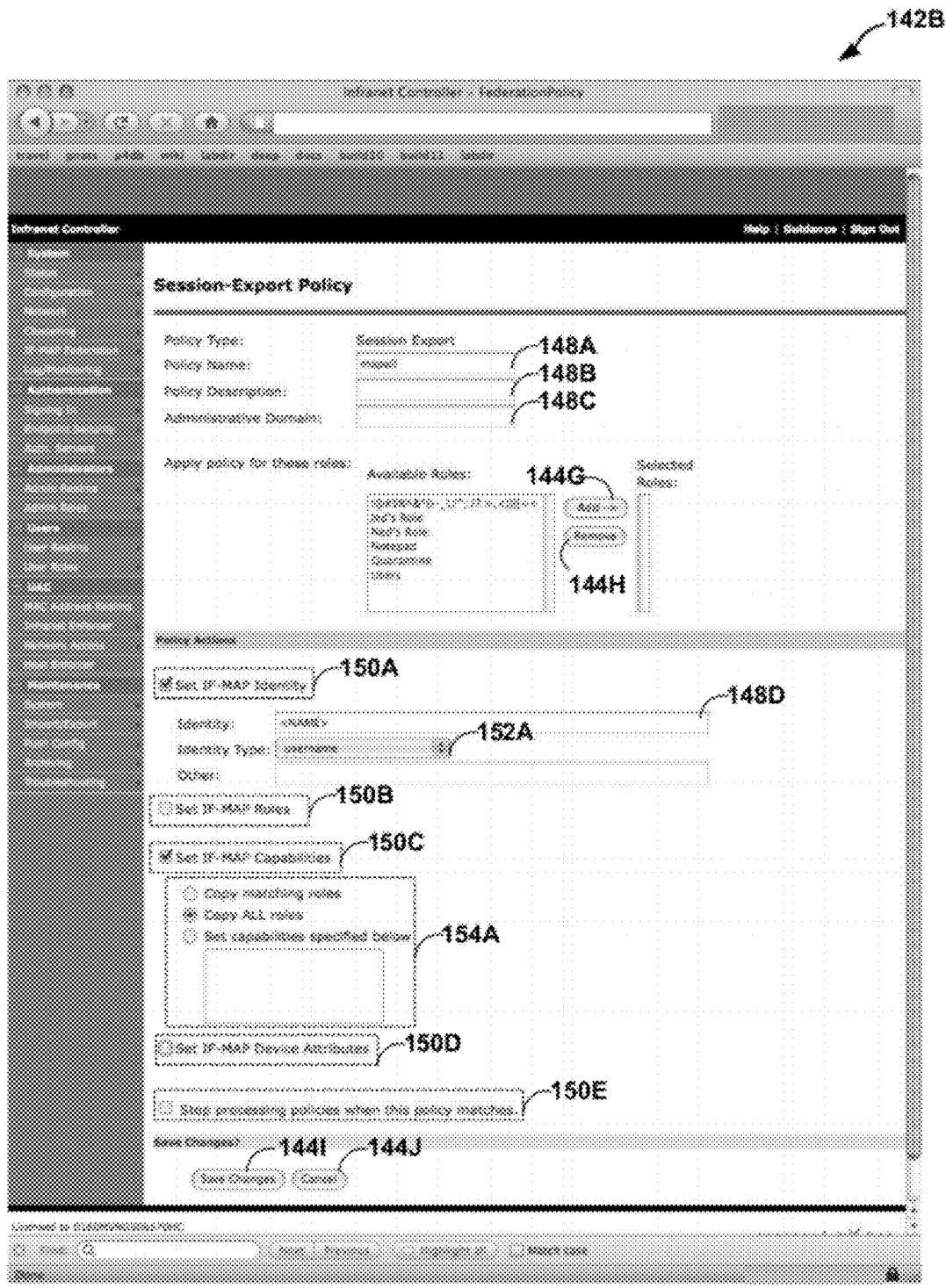
Figure 4C:
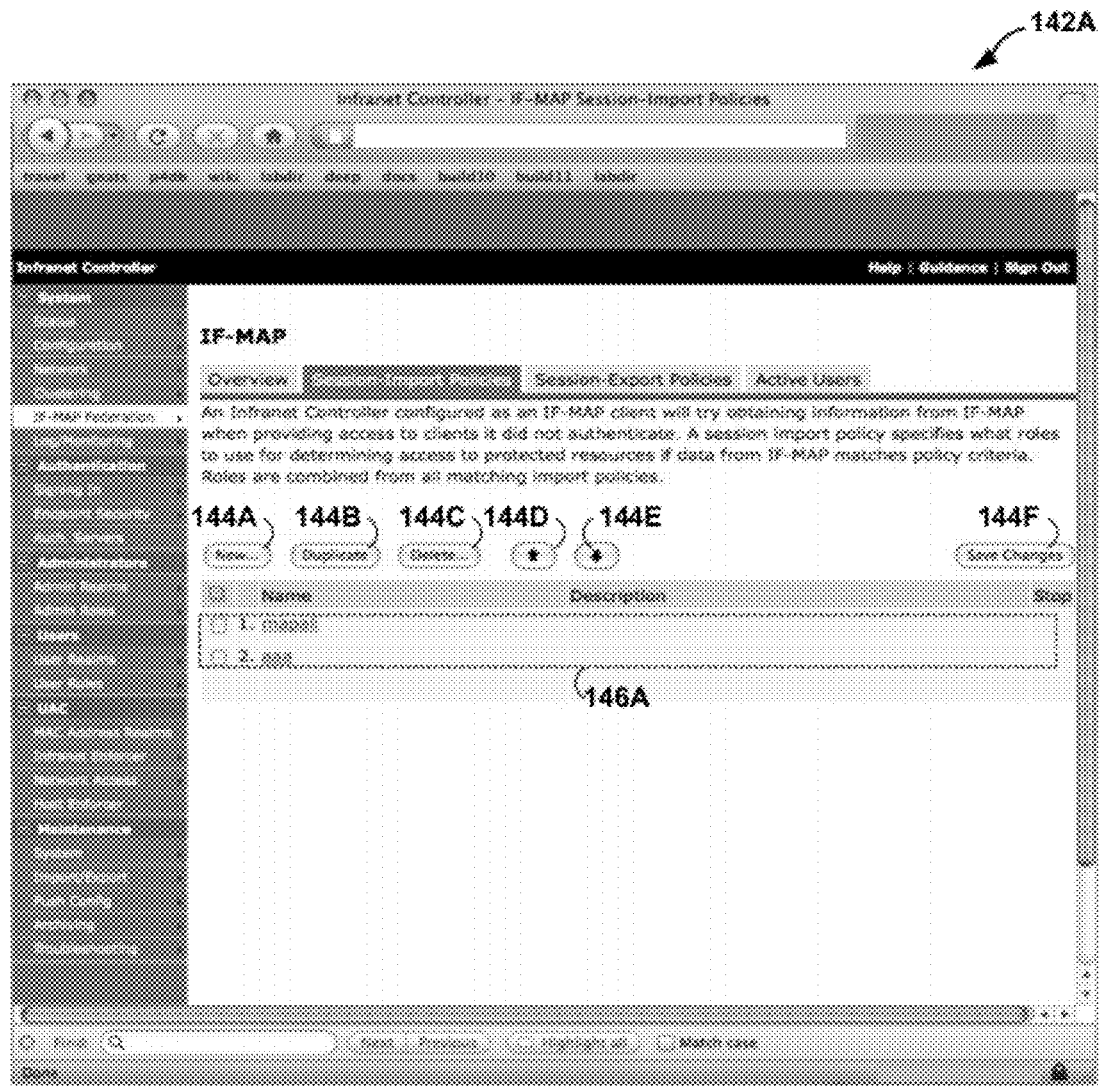
Figure 4D:
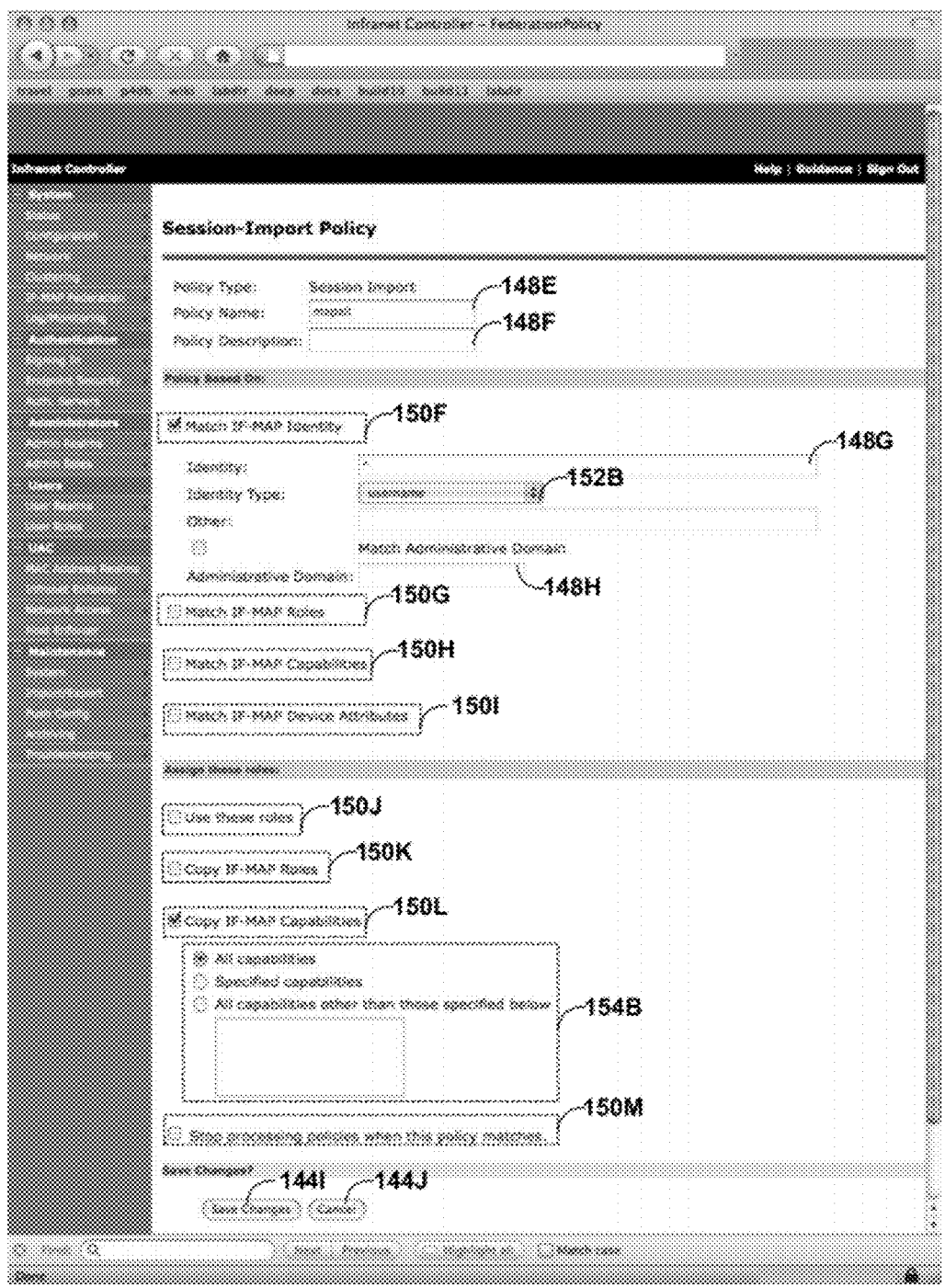

FIGS. 4A-4D are screenshots illustrating example user interfaces 142A-142D that one or more network devices that implement the techniques described herein may present in order to facilitate entering data to define, edit, update, and view translation policies. FIG. 4A is a screenshot illustrating an example user interface 142A within which a user, such as admin 46, may interact to view, create, duplicate, delete or otherwise edit, alter or create export policies in accordance with the techniques described in this disclosure. FIG. 4B is a screenshot illustrating an example user interface 142B with which a user, such as admin 46, may interact to edit a new or previously created export policy in accordance with the techniques described in this disclosure. FIG. 4C is a screenshot illustrating an example user interface 142C with which a user, such as admin 46, may interact to view, create, duplicate, delete or otherwise edit, alter or create import policies in accordance with the techniques described in this disclosure. FIG. 4D is a screenshot illustrating an example user interface 142D within which a user, such as admin 46, may interact to edit a new or previously created import policy in accordance with the techniques described in this disclosure.

Referring to the example of FIG. 4A, an authentication device, such as RADIUS server 12 of FIG. 2A, may present user interface 142A to enable admin 46 to enter data defining translation polices 52 and particularly those of translation policies 52 that comprise export translation policies. UI module 38 of RADIUS server 12 may present this user interface 142A to admin 46. Notably, user interface 142A comprises a web-based user interface that may be accessed remotely via an Internet browser application. While described with respect to this remote web-based user interface, the techniques should not be limited to this example but may be implemented with respect to any type of local or remote user interface.

User interface 142A, as shown in the example of FIG. 4A, includes a plurality of input mechanisms, such as buttons 144A-144F and interactive text field 146A. Button 144A is one example of an input mechanism that when selected causes UI module 38 to present another user interface, such as user interface 142B, with which admin 46 may interact to define a new export policy. Button 144B represents one example of an input mechanism with which a user may interact to duplicate an export policy listed in interact text field 146A. Duplication of existing export policies may enable admin 46 to quickly create new export policies that vary only slightly from existing export policies. Rather than create a new policy and manually copy a large portion of the data defining an existing policy, duplicate button 144B, when selected, automatically copies data from an identified existing export policy to a new policy, which is then displayed via a user interface similar to that shown in FIG. 4B, except that the text input fields are pre-populated with data from an existing export policy. Admin 46 may interact with this user interface to quickly edit the pre-populated data and thereby tailor the new derivative export policy to suit a slightly different form of export.

Button 144C may represent one example of an input mechanism with which admin 46 may interact to delete an identified one of the existing export policies shown in text field 146A. Buttons 144D and 144E may represent exemplary input mechanisms with which admin 46 may interact to reorder, up or down respectively, a selected one of the list of export policies shown in text field 146A. Button 144F represents an example input mechanism with which admin 46 may interact to save any changes to export policies shown in text field 146A, such as an ordering, a deletion or other action with respect to these listed export polices.

Interactive text field 146A may represent one exemplary form of a table-based text field that lists export policies, such as the export policy shown in FIG. 4A under the name "mapall." Interactive text field 146A may comprise checkboxes or other input mechanisms by which to identify one or more of the listed export policies. Admin 46 may select the check box next to the "mapall" export policy and then successively select one of buttons 144A-144E to perform the corresponding operation on the selected mapall export policy. Interactive text field 146A may also be interactive in that admin 46 may select the name of the export policy to view the mapall export policy in more detail via another user interface, such as user interface 142B.

Referring to the example of FIG. 4B, user interface 142B may, much like user interface 142A, represent a web-based user interface with which admin 46 may remotely interact to enter data defining or editing a new or existing export policy, respectively. In the example of FIG. 4B, admin 46 may cause UI module 38 to present user interface 142B by selecting the "mapall" export policy name in text field 146A, which may comprise a HTTP embedded link to user interface 142B. UI module 38, upon receiving the selection of this link, may present user interface 142B.

User interface 142B comprises a number of input mechanisms, including buttons 144G-144J, text inputs 148A-148D, checkbox inputs 150A-150E, drop-down selector input 152A, and complex radio input 154A. Buttons 144G and 144H may represent exemplary input mechanisms with which admin 46 may interact to add or remove roles from the current export policy. Roles may refer to vendor-specific authorization data. Buttons 144I and 144J may represent exemplary input mechanisms with which admin 46 may interact to save or cancel, respectively, the data entered to define or, in this case edit, a new or existing export policy. Cancelling the data may not save any changes and UI module 38 may prompt admin 46 prior to cancelling these changes to ensure admin 46 intends to cancel these changes.

Text input 148A may represent one input mechanism with which admin 46 may interact to enter text data to define a name for the export policy. Text input 148B may represent one input mechanism with which admin 46 may interact to enter text data defining a description of the export policy. Text input 148C may represent one input mechanism with which admin 46 may interact to enter text data defining an administrative domain for the export policy. Text input 148D may represent one input mechanism with which admin 46 may interact to enter text data defining an IF-MAP identity name.

Checkbox input 150A may represent one input mechanism with which admin 46 interacts to define a "Set IF-MAP Identity" policy action. An IF-MAP identity may refer to the above described identity information. Selecting this input 150A may expand user interface to show text input 148D and drop down selector input 152A. Drop down selector input 152A may represent one input mechanism with which admin 46 interacts to select one of a plurality of IF-MAP identity types. By interacting with text field 148A and drop down selector input 152A, admin 46 may define a mapping between those of the "Roles" selected via button 144G (or the selected roles), to the defined IF-MAP identity.

Checkbox input 150B may represent one input mechanism with which admin 46 interacts to define a "Set IF-MAP Roles" policy action. Selecting this input 150B may expand user interface 142B and provide further input mechanisms with which admin 46 may interact to map the selected roles to the IF-MAP roles. Checkbox input 150C may represent one input mechanism with which admin 46 interacts to define a "Set IF-MAP Capabilities" policy action. Upon selecting input 150C, user interface 142B may expand to show complex radio input 154A, which may represent an input mechanism with which admin 46 may interact to map "matching roles," "ALL roles," or select "capabilities specified below" to the IF-MAP capabilities.

Checkbox input 150D may represent one input mechanism with which admin 46 interacts to select a "Set IF-MAP Device Attributes" policy action. Again, admin 46 may select input 150D and user interface 142B may expand to show additional input mechanisms with which admin 46 may interact to define a mapping between those of the selected roles and the IF-MAP device attributes. Checkbox input 150E may represent one input mechanism with which admin 46 interacts to select a "Stop processing policies when this policy matches" policy action. By selecting this input 150E, admin 46 may indicate that this is the only export policy that need be applied to translate information prior to exporting this information to the IF-MAP server. Admin 46 may interact with these various input mechanism to define an export policy, which may facilitate the translation of authorization information stored in accordance with a vendor-specific data model from the vendor-specific data model to a vendor-neutral data model.

Referring to the example of FIG. 4C, a network security device, such as firewall 14A of FIG. 2B, may present user interface 142C to enable admin 46 to enter data defining translation polices 94 and particularly those of translation policies 94 that comprise export translation policies. UI module 82 of firewall 14A may present this user interface 142C to admin 46. Notably, user interface 142C comprises a web-based user interface that may be accessed remotely via an Internet browser application. While described with respect to this remote web-based user interface, the techniques should not be limited to this example but may be implemented with respect to any type of local or remote user interface.

User interface 142C may be similar to user interface 142A described above with respect to FIG. 4A, except that user interface 142C is directed to import policies rather than export policies. Regardless of the difference, user interface 142C includes similar if not exactly the same plurality of input mechanisms, where buttons 144A-144F are the same as buttons 144A-144F of user interface 142A and interact text field 146B, while providing the same listing of policies, differs not in operation but in content, e.g., displays import policies rather than export policies. Thus, user interface 142C functions much like user interface 142A to display policies and facilitates viewing, editing, deleting, defining and other actions with respect to these policies.

Referring to the example of FIG. 4D, user interface 142D may, much like user interface 142C, represent a web-based user interface with which admin 46 may remotely interact to enter data defining or editing a new or existing import policy, respectively. In the example of FIG. 4D, admin 46 may cause UI module 38 to present user interface 142D by selecting the "mapall" export policy name in text field 146B, which may comprise a HTTP embedded link to user interface 142D. UI module 38, upon receiving the selection of this link, may present user interface 142D.

User interface 142D comprises a number of input mechanisms, including text inputs 148E-148H, checkbox inputs 150E-150M, drop-down selector input 152B, and complex radio input 154B. Text input 148E may represent one input mechanism with which admin 46 may interact to enter text data to define a name for the import policy. Text input 148F may represent one input mechanism with which admin 46 may interact to enter text data defining a description of the import policy. Text input 148G may represent one input mechanism with which admin 46 may interact to enter text data defining an IF-MAP identity name. Text input 148H may represent one input mechanism with which admin 46 may interact to enter text data defining an administrative domain for the import policy.

Checkbox input 150F may represent one input mechanism with which admin 46 interacts to define a "Match IF-MAP Identity." In other words, admin 46 may interact with input 150F to enter IF-MAP Identity class information used to match against receive IF-MAP information. In the event of a match, firewall 14A applies this policy to the matching IF-MAP information to successfully import this IF-MAP information. Selecting this input 150A may expand the user interface to show text inputs 148G and 148H and drop down selector input 152B. Drop down selector input 152B may represent one input mechanism with which admin 46 interacts to select one of a plurality of IF-MAP identity types. Again, by interacting with text fields 148G, 148H and drop down selector input 152B, admin 46 may define criteria on which to base application of the import policy. Selecting more than one checkbox input 150E-150H may enable further granularity in the application of this import policy, as the matching criteria may be defined with further specificity.

Checkbox input 150G may represent one input mechanism with which admin 46 interacts to define a "Match IF-MAP Roles." Selecting this input 150G may expand user interface 142D and provide further input mechanisms with which admin 46 may interact to define additional matching criteria, e.g., IF-MAP Roles criteria, on which to base application of this import policy. Checkbox input 150H may represent one input mechanism with which admin 46 interacts to define a "Match IF-MAP Capabilities." Upon selecting input 150H, user interface 142D may expand to show further input mechanisms with which admin 46 may interact to define additional matching criteria, e.g., IF-MAP Capabilities criteria, on which to base application of this import policy. Checkbox input 150I may represent one input mechanism with which admin 46 interacts to define a "Match IF-MAP Device Attributes." Selecting this input 150I may expand user interface 142D and provide further input mechanisms with which admin 46 may interact to define additional matching criteria, e.g., IF-MAP device attributes criteria, on which to base application of this import policy.

Checkbox input 150J may represent one input mechanism with which admin 46 interacts to define data to cause the import policy to "Use these roles." Selecting input 150J may cause user interface 142D to expand and show additional input mechanisms with which admin 46 may interact to select one or more roles, possibly in the same manner as described above with respect to selecting roles using user interface 142B. Checkbox 150K may represent one input mechanism with which admin 46 interacts to define data to cause the import policy to "Copy IF-MAP roles." Selecting input 150K may cause user interface 142D to expand and show additional input mechanisms with which admin 46 may interact to copy one or more IF-MAP roles. Checkbox 150L may represent one input mechanism with which admin 46 interacts to define data to cause the import policy to "Copy IF-MAP Capabilities." Upon selecting input 150L, user interface 142D may expand to show complex radio input 154B, which may represent an input mechanism with which admin 46 may interact to copy "All capabilities," "specified capabilities," or "All capabilities other than those specified below." Checkbox 150M may be substantially similar to checkbox input 150E of user interface 142B. By selecting this input 150M, admin 46 may indicate that this is the only import policy that need be applied to translate information prior to exporting this information to the IF-MAP server. Admin 46 may interact with these various input mechanism to define an import policy, which may facilitate the translation of authorization information stored in accordance with a vendor-neutral data model from the vendor-neutral data model to a vendor-specific data model.

The various user interfaces 142A-142D are described above as being presented by select devices, e.g., RADIUS server 12 and firewall 14A, where RADIUS server 12 presents user interfaces 142A and 142B and firewall 14A presents user interfaces 142C and 142D. While described in this manner for purposes of illustration, RADIUS server 12 may present user interfaces 142C and 142D and firewall 14A may present user interfaces 142A and 142B. The techniques therefore should not be limited in this respect.

In this respect, the techniques may facilitate communication of authorization information between devices that implement different authorization data models. The techniques leverage the vendor-neutral authorization data model to reduce export and import complexity. In other words, rather than implement an import and export policy to translate between every combination of vendor-specific authorization data models, the techniques reduce the number of import and export policies required to translate between vendor-specific authorization data models by using the vendor-neutral authorization data model as a go-between. As an example, consider N different vendor-specific authorization data models. To convert or translate directly between these N different vendor-specific authorization data models, $N^2-N$ (which is approximately $N^2$) number of translation policies need be defined. However, by converting or translating to the vendor-neutral authorization data model, only N number of translation policies need be defined. In this respect, the techniques may leverage the vendor-neutral authorization data model to reduce complexity.

Various embodiments of the invention have been described. These and other embodiments are within the scope of the following claims.

The invention claimed is:

1. A method comprising:
  receiving, with an authentication device, authentication information from an endpoint device;
  authenticating, with the authentication device, the endpoint device based on the authentication information;
  based on the authentication, storing, with the authentication device, authorization information in accordance with a first proprietary authorization data model;
  applying, with the authentication device, an export translation policy to translate the authorization information stored in accordance the first proprietary authorization data model into translated authorization information that complies with a second Interface for Metadata Access Point (IF-MAP) authorization data model conforming to an IF-MAP standard, wherein the second IF-MAP authorization data model is different from the first proprietary authorization data model; and
  publishing, with the authentication device, the translated authorization information in accordance with an IF-MAP protocol to an intermediate storage device that implements the second IF-MAP authorization data model.

2. The method of claim 1,
  wherein receiving authentication information comprises receiving security credentials and health information from an endpoint device, and the method further comprising storing data defining at least one authentication policy, wherein the at least one authentication policy defines rules by which to authenticate the authentication information, and wherein authenticating the endpoint device comprises applying the rules defined by the at least one authentication policy to authenticate the authentication information received from the endpoint device.

3. The method of claim 1, further comprising:

presenting, with the authentication device, a user interface by which to receive data defining the export translation policy;

receiving, with the authentication device, the data defining the export translation policy via the user interface; and storing, with the authentication device, the data defining the export translation policy.

4. The method of claim 1, wherein the first proprietary authorization data model defines a first set of classes by which to classify portions of the authorization information, wherein the second IF-MAP authorization data model defines a second set of classes by which to classify portions of the translated authorization information, wherein at least one of the classes of the first set is different from at least one of the classes of the second set, wherein the export translation policy comprises data that defines rules to map each class of the first set of classes to one or more classes of the second set of classes, and wherein applying the export translation policy comprises applying the rules of the export translation policy to map each of the classified portions of the authentication information to a corresponding one or more of the classified portions of the translated authentication information.

5. The method of claim 1, wherein publishing the translated authorization information comprises:

generating a publish IF-MAP message that includes the translated authorization information in accordance with the IF-MAP standard; and forwarding the publish IF-MAP message to the intermediate storage device that implements the IF-MAP data model.

6. The method of claim 1, wherein the authentication device comprises a Remote Access Dial In User Service (RADIUS) server.

7. A method comprising:

receiving, with a network security device, network traffic from an endpoint device;

in response to receiving the network traffic, requesting, with the network security device, authorization information from an intermediate storage device in accordance with Interface for Metadata Access Point (IF-MAP) protocol, wherein the intermediate storage device stores the authorization information in accordance with a first IF-MAP authorization data model that complies with an IF-MAP standard;

receiving, with the network security device, the authorization information from the intermediate storage device;

applying, with the network security device, an import translation policy to translate the authorization information stored in accordance the first IF-MAP authorization data model into translated authorization information that complies with a second proprietary authorization data model, wherein the second IF-MAP authorization data model is different from the first proprietary authorization data model; and forwarding, with the network security device, the network traffic based on the translated authorization information.

8. The method of claim 7, wherein the authorization information comprises information about the user operating the endpoint device or information that identifies the endpoint device itself, health information associated with the endpoint device, capability information describing capabilities associated with the endpoint device, role information describing roles associated with the endpoint device, access information about how the endpoint device is accessing the network, and the method further comprising storing data defining at least one admission control policy, wherein the at least one admission control policy defines rules by which to determine whether to admit the network traffic received from the endpoint device, and wherein forwarding the network traffic comprises:

applying the rules defined by the admission control policy to determine whether to admit the network traffic received from the endpoint device; and forwarding the network traffic based on the application of the admission control policy.

9. The method of claim 7, further comprising:

presenting, with the network security device, a user interface by which to receive data defining the import translation policy;

receiving, with the network security device, the data defining the import translation policy via the user interface; and storing, with the network security device, the data defining the import translation policy.

10. The method of claim 7, wherein the first IF-MAP authorization data model defines a first set of classes by which to classify portions of the authentication information, wherein the second proprietary authorization data model defines a second set of classes by which to classify portions of the translated authorization information, wherein at least one of the classes of the first set is different from at least one of the classes of the second set, wherein the import translation policy comprises data that defines rules to map each class of the first set of classes to one or more classes of the second set of classes, and wherein applying the import translation policy comprises applying the rules of the import translation policy to map each of the classified portions of the authentication information to a corresponding one or more of the classified portions of the translated authentication information.

11. The method of claim 7, wherein requesting the authorization information comprises:

generating a search IF-MAP message that requests the authorization information corresponding to the endpoint device; and forwarding the search IF-MAP message to the intermediate storage device that implements the IF-MAP data model.

12. The method of claim 7, wherein requesting the authorization information comprises:

generating a subscribe IF-MAP message that requests a subscription to the authorization information corresponding to the endpoint device;

forwarding the subscribe IF-MAP message to the intermediate storage device that implements the IF-MAP authorization data model;

generating a poll IF-MAP message that requests the authorization information corresponding to the subscription requested by the subscribe IF-MAP message; and forwarding the poll IF-MAP message to the intermediate storage device that implements the IF-MAP authorization data model.

13. The method of claim 7,
wherein the network security device comprises a firewall.

14. An authentication device comprising:
an authorization database that stores authorization information in accordance with a first proprietary authorization data model;
a policy database that stores data defining an export translation policy; and
a control unit comprising:
an authorization agent that receives authentication information from an endpoint device, authenticates the endpoint device based on the authentication information, and stores, based on the authentication, authorization information in accordance with the first proprietary authorization data model to the authorization database;
a translation module that applies the export translation policy to translate the received authorization information stored in accordance with the first proprietary authorization data model into translated authorization information that complies with a second Interface for Metadata Access Point (IF-MAP) authorization data model conforming to an IF-MAP standard, wherein the second IF-MAP authorization data model is different from the first proprietary authorization data model; and
a client module that publishes the translated authorization information to an intermediate storage device that implements the second IF-MAP authorization data model.

15. The authentication device of claim 14,
wherein the authorization database further stores data defining at least one authorization policy, wherein the at least one authorization policy defines rules by which to authenticate the authorization information, and
wherein the authorization module receives security credentials and health information from an endpoint device and applies the rules defined by the at least one authentication policy to authenticate the authentication information received from the endpoint device.

16. The authentication device of claim 14, wherein the control unit further comprises a user interface module that presents a user interface by which to receive data defining the export translation policy, receive the data defining the export translation policy via the user interface and store the data defining the export translation policy.

17. The authentication device of claim 14,
wherein the first proprietary authorization data model defines a first set of classes by which to classify portions of the authorization information,
wherein the second IF-MAP authorization data model defines a second set of classes by which to classify portions of the translated authorization information, wherein at least one of the classes of the first set is different from at least one of the classes of the second set, wherein the export translation policy comprises data that defines rules to map each class of the first set of classes to one or more classes of the second set of classes, and wherein the translation module applies the rules of the export translation policy to map each of the classified portions of the authentication information to a corresponding one or more of the classified portions of the translated authentication information.

18. The authentication device of claim 14,
wherein the client module generates a publish IF-MAP message that includes the translated authorization information in accordance with the IF-MAP standard and forwards the publish IF-MAP message to the intermediate storage device that implements the IF-MAP data model.

19. The authentication device of claim 14,
wherein the authorization device comprises a Remote Access Dial In User Service (RADIUS) server.

20. A network security device comprising:
a policy database that stores an import translation policy; and
a control unit comprising:
an admission module that receives network traffic from an endpoint device;
a client module that requests, in response to receiving the network traffic, authorization information from an intermediate storage device in accordance with an Interface for Metadata Access Point (IF-MAP) protocol and receives the authorization information from the intermediate storage device, wherein the intermediate authorization storage device stores the authorization information in accordance with a first IF-MAP authorization data model that confirms to an IF-MAP standard; and
a translation module that applies the import translation policy to translate the authorization information stored in accordance the first IF-MAP authorization data model into translated authorization information that complies with a second proprietary authorization data model, wherein the second IF-MAP authorization data model is different from the first proprietary authorization data model,
wherein the admission module forwards the network traffic based on the translated authorization information.

21. The network security device of claim 20, further comprising an admission control database that stores data defining at least one admission control policy, wherein the at least one admission control policy defines rules by which to determine whether to admit the network traffic received from the endpoint device,
wherein the authorization information comprises information about the user operating the endpoint device or information that identifies the endpoint device itself, health information associated with the endpoint device, capability information describing capabilities associated with the endpoint device, role information describing roles associated with the endpoint device, access information about how the endpoint device is accessing the network,
wherein the admission module applies the rules defined by the admission control policy to determine whether to admit the network traffic received from the endpoint device and forwards the network traffic based on the application of the admission control policy.

22. The network security device of claim 20, wherein the control unit further comprises a user interface module that presents a user interface by which to receive data defining the import translation policy, receives the data defining the import translation policy via the user interface and stores the data defining the import translation policy.

23. The network security device of claim 20,
wherein the first IF-MAP authorization data model defines a first set of classes by which to classify portions of the authorization information,
wherein the second proprietary authorization data model defines a second set of classes by which to classify portions of the translated authorization information, wherein at least one of the classes of the first set is different from at least one of the classes of the second set,
wherein the import translation policy comprises data that defines rules to map each class of the first set of classes to one or more classes of the second set of classes, and
wherein the translation module applies the rules of the import translation policy to map each of the classified portions of the authentication information to a corresponding one or more of the classified portions of the translated authentication information.

24. The network security device of claim 20,
wherein the client module generates a search IF-MAP message that requests the authorization information corresponding to the endpoint device and forwards the search IF-MAP message to the intermediate storage device that implements the IF-MAP data model.

25. The network security device of claim 20,
wherein the client module generates a subscribe IF-MAP message that requests a subscription to the authorization information corresponding to the endpoint device, forwards the subscribe IF-MAP message to the intermediate storage device that implements the IF-MAP data model, generates a poll IF-MAP message that requests the authorization information corresponding to the subscription requested by the subscribe IF-MAP message, and forwards the poll IF-MAP message to the intermediate storage device that implements the IF-MAP data model.

26. The network security device of claim 20,
wherein the network security device comprises a firewall.

27. A network system comprising:
an endpoint device;
a network that includes:
an authentication device that authenticates the endpoint device in accordance with a first authorization data model;
an intermediate storage device that implements a vendor-neutral authorization data model;
a protected resource server; and
a network security device that controls access to the protected resource server in accordance with a second authorization data model,
wherein the authentication device comprises:
a first authorization database that stores authorization information in accordance with the first authorization data model;
a first policy database that stores data defining an export translation policy; and
a first control unit that comprises:
an authorization agent that receives authentication information from an endpoint device, authenticates the endpoint device based on the authentication information, and stores, based on the authentication, authorization information in accordance with the first authorization data model to the authorization database;
a first translation module that applies the export translation policy to translate the received authorization information stored in accordance the first authorization data model into translated authorization information that complies with the vendor-neutral authorization data model, wherein the vendor-neutral authorization data model is different from the first authorization data model; and
a first client module that publishes the translated authorization information to an intermediate storage device that implements the vendor-neutral authorization data model, and
wherein the network security device comprises:
a second policy database that stores an import translation policy; and
a second control unit that comprises:
an admission module that receives network traffic from an endpoint device;
a second client module that requests, in response to receiving the network traffic, authorization information from an intermediate storage device and receives the authorization information from the intermediate storage device, wherein the intermediate authorization storage device stores the authorization information in accordance with the vendor-neutral authorization data model; and
a second translation module that applies the import translation policy to translate the authorization information stored in accordance the vendor-neutral authorization data model into translated authorization information that complies with the second authorization data model, wherein the second authorization data model is different from the vendor-neutral authorization data model,
wherein the admission module forwards the network traffic based on the translated authorization information.

28. The network system of claim 27, wherein the vendor-neutral authorization data model comprises an Interface for Metadata Access Point (IF-MAP) authorization data model that complies with an IF-MAP standard.

29. The network system of claim 27,
wherein the first authorization data model comprise a first vendor-specific authorization data model,
wherein the second authorization data model comprises a second vendor-specific authorization data model,
wherein the first vendor-specific authorization data model is different from the second vendor-specific authorization data model.

30. A non-transitory computer-readable medium comprising instructions for causing a programmable processor to:
receive, with an authentication device, authentication information from an endpoint device;
authenticates with the authentication device, the endpoint device based on the authentication information;
based on the authentication, store, with the authentication device, the authorization information in accordance with a first authorization data model;
apply, with the authentication device, an export translation policy to translate the authorization information stored in accordance the first authorization data model into translated authorization information that complies with a second authorization data model, wherein the second authorization data model is different from the first authorization data model; and
publish, with the authentication device, the translated authorization information to an intermediate storage device that implements the second authorization data model.

31. A non-transitory computer-readable medium comprising instructions for causing a programmable processor to:

receive, with a network security device, network traffic from an endpoint device;

in response to receiving the network traffic, request, with the network security device, authorization information from an intermediate storage device in accordance with an Interface for Metadata Access Point (IF-MAP) protocol, wherein the intermediate storage device stores the authorization information in accordance with a first IF-MAP authorization data model that conforms to an IF-MAP standard;

receive, with the network security device, the authorization information from the intermediate storage device;

apply, with the network security device, an import translation policy to translate the authorization information stored in accordance the first IF-MAP authorization data model into translated authorization information that complies with a second proprietary authorization data model, wherein the second IF-MAP authorization data model is different from the first proprietary authorization data model; and forward, with the network security device, the network traffic based on the translated authorization information.

* * * * *